US012611884B2

(12) United States Patent
Kataoka et al.

(10) Patent No.: US 12,611,884 B2
(45) Date of Patent: Apr. 28, 2026

(54) SHEET THERMOCOMPRESSION APPARATUS AND POST-PROCESSING APPARATUS

(71) Applicant: CANON KABUSHIKI KAISHA, Tokyo (JP)

(72) Inventors: Hiroshi Kataoka, Shizuoka (JP); Kenji Takagi, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 13 days.

(21) Appl. No.: 18/775,153

(22) Filed: Jul. 17, 2024

(65) Prior Publication Data

US 2025/0026140 A1 Jan. 23, 2025

(30) Foreign Application Priority Data

Jul. 21, 2023 (JP) ................................ 2023-119406

(51) Int. Cl.
*G03G 15/00* (2006.01)
*B42C 1/12* (2006.01)
*B42C 9/00* (2006.01)

(52) U.S. Cl.
CPC .............. *B42C 9/0093* (2013.01); *B42C 1/12* (2013.01); *G03G 15/6544* (2013.01); (Continued)

(58) Field of Classification Search
None
See application file for complete search history.

(56) References Cited

U.S. PATENT DOCUMENTS

| | | | | |
|---|---|---|---|---|
| 10,824,103 B1 * | 11/2020 | Doi | .................... | G03G 15/2042 |
| 2014/0227064 A1 * | 8/2014 | Matsue | ................. | B42C 13/003 412/37 |

FOREIGN PATENT DOCUMENTS

| | | |
|---|---|---|
| EP | 2774881 B1 | 10/2015 |
| JP | 2000255881 A | 9/2000 |

(Continued)

OTHER PUBLICATIONS

English translation of JP 2005-162352 A, publication date Jun. 23, 2005. (Year: 2005).*

(Continued)

*Primary Examiner* — Leslie J Evanisko
(74) *Attorney, Agent, or Firm* — ROSSI, KIMMS & McDOWELL LLP

(57) ABSTRACT

Provided is a sheet thermocompression apparatus for bonding a plurality of sheets to one another, the sheet thermocompression apparatus including: a loading portion in which sheets having adhesion toner formed thereon are loaded in a loading direction; and a thermocompression unit including a pressing member elongated in a longitudinal direction, for pressing the sheets loaded in the loading portion in the loading direction, and a heating source for heating the pressing member. In a case where the pressing member is viewed from the loading direction, the pressing member overlaps a region of a sheet loaded in the loading portion from one end portion to the other end portion in the longitudinal direction. The heating source is capable of heating an end portion and a center portion of the pressing member in the longitudinal direction to different temperatures.

22 Claims, 12 Drawing Sheets

(52) U.S. Cl.
CPC .................. *G03G 15/6585* (2013.01); *G03G 2215/00835* (2013.01); *G03G 2215/00936* (2013.01)

(56) References Cited

FOREIGN PATENT DOCUMENTS

| | | | | | |
|---|---|---|---|---|---|
| JP | 2005162352 A | * | 6/2005 | .............. | B65H 1/00 |
| JP | 2014151640 A | | 8/2014 | | |

OTHER PUBLICATIONS

English language translation of JP 2000-255881 A, publication date Sep. 19, 2000. (Year: 2000).*
Extended European Search Report issued in European Appln. No. 24189676.0 mailed Dec. 12, 2024.

* cited by examiner

SHEET THERMOCOMPRESSION APPARATUS AND POST-PROCESSING APPARATUS

BACKGROUND OF THE INVENTION

Field of the Invention

The present invention relates to a sheet thermocompression apparatus, and a post-processing apparatus including a sheet thermocompression apparatus.

Description of the Related Art

Conventionally, in regard to a plurality of sheets that have been subjected to image forming processing by an image forming apparatus, a method for pressing a sheet by a sheet thermocompression apparatus and melting an adhesion layer (adhesion toner) on the sheet again to perform adhesion processing and make a booklet has been known. Examples of the adhesion method for a booklet by sheet thermocompression include corner adhesion where one of four corners of a sheet is used for adhesion and line adhesion where the entire edge portion along one side of a sheet is used for adhesion.

Japanese Patent Application Publication No. 2000-255881 discloses a configuration of a sheet thermocompression apparatus in which a thermocompression unit (refixing means) is used to heat and press a bundle of sheets having adhesion toner formed thereon to perform adhesion processing. The above-mentioned sheet thermocompression apparatus is capable of executing adhesion processing by corner adhesion and line adhesion for a bundle of sheets by using a plurality of thermocompression units in different ways or moving a thermocompression unit.

SUMMARY OF THE INVENTION

However, in the configuration including a plurality of thermocompression units, the thermocompression units are independently driven, and hence operation control of the thermocompression units may be complicated and the ease of maintenance of the thermocompression units may be low. On the other hand, in a configuration in which a single thermocompression unit is moved to execute adhesion processing, only a corner portion of a sheet is pressed during adhesion processing for corner adhesion, and hence a booklet is made while a part of sheets are displaced during thermocompression operation, which may decrease the quality of the booklet.

In view of the above-mentioned problem, it is an object of the present invention to provide a sheet thermocompression apparatus capable of executing stable thermocompression operation.

In order to achieve the above-mentioned object, a sheet thermocompression apparatus according to the present disclosure is a sheet thermocompression apparatus for bonding a plurality of sheets to one another, the sheet thermocompression apparatus comprising:

- a loading portion in which sheets having adhesion toner formed thereon are loaded in a loading direction; and
- a thermocompression unit comprising:
  - a pressing member elongated in a longitudinal direction, for pressing the sheets loaded in the loading portion in the loading direction, the pressing member overlapping a region of a sheet loaded in the loading portion from one end portion to another end portion in the longitudinal direction in a case where the pressing member is viewed from the loading direction; and
  - a heating source for heating the pressing member, the heating source being capable of heating an end portion and a center portion of the pressing member in the longitudinal direction to different temperatures.

According to the present invention, the sheet thermocompression apparatus capable of executing stable thermocompression operation can be provided.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. In addition, not all features described in the following embodiments are essential to solutions provided by the invention.

A sheet thermocompression apparatus of the present invention is particularly suitable for a sheet thermocompression apparatus for making a booklet in which a plurality of sheets bonded to one another. Hereinafter, as an example of a sheet thermocompression apparatus to which the present invention is applied, a sheet thermocompression apparatus provided to a post-processing apparatus which is connected to an image forming apparatus for forming an image on a sheet and to which the sheet is conveyed from the image forming apparatus is described.

Example 1

Image Forming Apparatus

Figure 1:
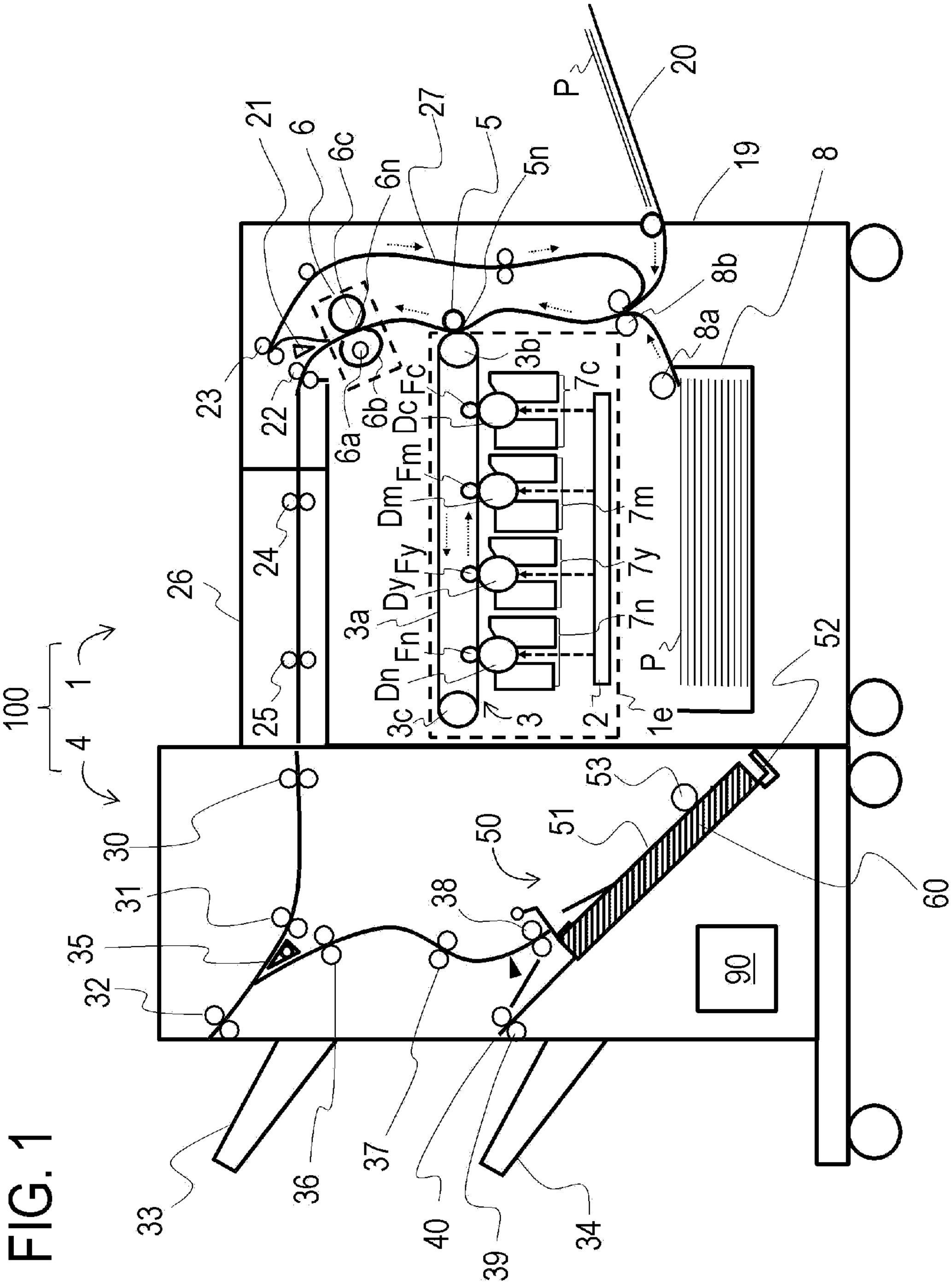
FIG. 1 is a schematic cross-sectional diagram of an image forming apparatus according to Example 1.

FIG. 1 is a schematic cross-sectional diagram illustrating a schematic configuration of a multifunction peripheral 100 including an image forming apparatus 1 according to Example 1 and a post-processing apparatus 4 connected to the image forming apparatus 1. First, the overall configuration of the image forming apparatus 1 according to Example 1 is described with reference to FIG. 1. Note that, in Example 1, the post-processing apparatus 4 is described as an apparatus independent from the image forming apparatus 1, but the post-processing apparatus 4 may be regarded as an apparatus that constitutes the image forming apparatus 1. Furthermore, the image forming apparatus 1 may be another image forming apparatus using an electrophotographic recording system such as a copying machine and a fax machine.

As illustrated in FIG. 1, the image forming apparatus 1 includes a cassette 8 for storing sheets P as recording materials (recording media) therein, an image forming unit 1*e* (within a broken-line frame) as image forming means, a fixing unit 6 as fixing means, and a casing 19 that stores these components therein. The image forming apparatus 1 has a printing function for forming a toner image on a sheet P fed from the cassette 8 by the image forming unit 1*e* and performing fixing processing by the fixing unit 6 to obtain a printed object.

In Example 1, the maximum size of a sheet P on which an image can be formed by the image forming apparatus 1 is an A4 size (vertical 297 mm×horizontal 210 mm). The image forming apparatus 1 can perform image formation by conveying a sheet P of A4 size in a vertical direction (longitudinal direction is parallel to conveyance direction). The sheet conveyance speed in the image forming apparatus 1 in this case is 300 mm/sec.

The cassette 8 is inserted at a lower part of the image forming apparatus 1 so as to be withdrawable from the casing 19 of the image forming apparatus 1, and is capable of storing a large number of sheets P therein. A sheet P stored in the cassette 8 is fed from the cassette 8 by a feeding roller 8*a* as a feeding portion, and conveyed by a conveyance roller pair 8*b*. The image forming apparatus 1 further includes a multi tray 20, and can feed sheets P set in the multi tray 20 one by one.

The image forming unit 1*e* is a tandem electrophotographic unit including four process cartridges 7*n*, 7*y*, 7*m*, and 7*c*, a scanner unit 2, and a transfer unit 3. Hereinafter, the process cartridges 7*n*, 7*y*, 7*m*, and 7*c* are generically referred to as "process cartridge 7" unless otherwise distinguished. The same applies to members provided in the process cartridge 7 such as a photosensitive drum D.

The process cartridge 7 is a unit of a plurality of parts for an image forming process that can be replaced. Each of the process cartridges 7*n*, 7*y*, 7*m*, and 7*c* includes a photosensitive drum D (Dn, Dy, Dm, and Dc) as an image bearing member, a charging roller for charging the photosensitive drum D, and a toner storage portion for storing toner therein and supplying the toner to the photosensitive drum D.

Of the four process cartridges 7, three process cartridges 7*y*, 7*m*, and 7*c* on the right side in FIG. 1 are process cartridges for forming visible images on a sheet P, and form toner images of yellow, magenta, and cyan, respectively. On the other hand, the process cartridge 7*n* on the left side in FIG. 1 forms an adhesion toner image Ti as toner used for adhesion processing of another sheet P than a sheet P after printing.

In Example 1, in the case of printing a black image such as a text, the image is expressed by process black obtained by superimposing toners of yellow, magenta, and cyan. However, for example, the fifth process cartridge that uses black image toner may be added to the image forming unit 1*e* such that a black image can be expressed by black image toner. Without being limited thereto, the type and number of image toner can be changed depending on the purpose of the image forming apparatus 1.

Image Toner

In the present invention, conventionally and publicly known image toners can be used. Of those, image toner in which a thermoplastic resin is used as a binder resin is preferred. Resins that can be used for the thermoplastic resin are not particularly limited, and resins that are conventionally used for image toner, such as a polyester resin, a vinyl resin, an acrylic resin, and a styrene acrylic resin, can be used. Furthermore, the image toner may contain a plurality of the resins. The image toner is formed while containing a colorant, a magnetic substance, a charge control agent, a wax, or an external additive.

Adhesive Toner

In the present invention, adhesion toner containing a thermoplastic resin can be used. Resins that can be used for the thermoplastic resin are not particularly limited, and examples thereof include a polyester resin, a vinyl resin, an acrylic resin, and a styrene acrylic resin similarly to the image toner. Furthermore, the adhesion toner may contain a plurality of the resins. Similarly to the image toner, the adhesion toner may be formed while containing a colorant, a magnetic substance, a charge control agent, a wax, or an external additive. Furthermore, the image toner may be used as the adhesion toner as long as the image toner satisfies adhesion properties.

Image Forming Process

The scanner unit 2 is exposure means for irradiating photosensitive drums Dn, Dy, Dm, and Dc of the process cartridges 7*n*, 7*y*, 7*m*, and 7*c* with laser light to form electrostatic latent images. Note that the exposure means in the image forming apparatus 1 of an electrophotographic system is not limited to the above-mentioned configuration.

The transfer unit 3 includes an endless transfer belt 3*a* as an intermediate transfer member (secondary image bearing member), and an opposing roller 3*b* and a drive roller 3*c* that are located on the inner circumferential side of the transfer belt 3*a*. The transfer belt 3*a* is a belt member stretched over the opposing roller 3*b* and the drive roller 3*c*, and an outer circumferential surface thereof is opposed to the photosensitive drums Dn, Dy, Dm, and Dc. On the inner circumferential side of the transfer belt 3*a*, primary transfer rollers Fn, Fy, Fm, and Fc are disposed at positions corresponding to the photosensitive drums Dn, Dy, Dm, and Dc, respectively.

Furthermore, a secondary transfer roller 5 as transfer means is disposed at a position opposed to the opposing roller 3*b* through the transfer belt 3*a*. A transfer nip 5*n* formed between the secondary transfer roller 5 and the transfer belt 3*a* is a transfer portion (secondary transfer portion) for transferring a toner image from the transfer belt 3*a* to the sheet P.

Fixing Process

The fixing unit 6 is a fixing portion for heating, melting, and pressing a toner image formed on a sheet P such that the toner image is fixed on the sheet P as a permanent image.

The fixing unit 6 is a fixing unit of a thermal fixing system including a halogen heater 6*a* as a heat source, a heat roller 6*b* as a fixing member that includes the halogen heater 6*a* and is heated by the halogen heater 6*a*, and a pressure roller 6*c* as a pressing member.

Heating of the heat roller 6*b* may be implemented by a ceramic heater as a heating source or a heat generation mechanism of an induction heating system. The heat roller 6*b* may be used as a polyimide resin or a polyamide imide resin as a high heat resistant resin or a film on which or metal such as stainless steel is formed into a thin film.

The heat roller 6*b* is driven by drive means (not shown), and is pressed to the pressure roller 6*c* by biasing means such as a spring. Due to a pressing force of the pressure roller 6*c*, a fixing nip 6*n* is formed between the heat roller 6*b* and the pressure roller 6*c*. In the heat roller 6*b*, power input to the halogen heater 6*a* is adjusted by a control unit (not shown) such that a detection temperature of a thermistor (not shown) as a temperature detection element that contacts the surface of the halogen heater 6*a* becomes a predetermined value.

Image Forming Operation

Next, an image forming operation of the image forming apparatus 1 is described. When a printing instruction with image data to be printed is input to the image forming apparatus 1, the control unit in the image forming apparatus 1 starts a series of operations for conveying a sheet P and forming an image on the sheet P (conveyance operations by conveyance means and image forming operation). In FIG. 1, a conveyance direction of the sheet P and driving directions of the members are indicated by dotted-line arrows.

In the image forming operation, first, sheets P are fed from the cassette 8 one by one and conveyed toward the transfer nip 5*n* through the conveyance roller pair 8*b*. In parallel to the feeding of the sheets P, the process cartridges 7 are sequentially driven, and the photosensitive drums D are rotationally driven. The surface of the rotationally driven photosensitive drum D is applied with uniform charge by a charging roller (not shown). Furthermore, the scanner unit 2 irradiates the photosensitive drum D with laser light modulated on the basis of image data, thereby forming an electrostatic latent image on the surface of each photosensitive drum D. Then, the electrostatic latent image on the photosensitive drum D is developed as a toner image by toner carried by a developing roller in a toner storing portion in each process cartridge 7.

Note that an adhesion toner image Ti to be formed on the photosensitive drum Dn by adhesion toner is different from a toner image (normal toner image) of image toner for printing an image such as a text and a figure on a sheet P because the adhesion toner image Ti is not intended to communicate visual information. However, in the following description, the adhesion toner image Ti developed by an electrophotographic process in order to form the adhesion toner image Ti on a sheet P with a predetermined pattern is also treated as one type of "toner image".

A toner image formed by each process cartridge 7 is transferred (primarily transferred) onto the transfer belt 3*a* from each photosensitive drum D by an electric field formed between the photosensitive drum D and the primary transfer roller F. In this case, the transfer belt 3*a* rotates in the counterclockwise direction (arrow direction) in FIG. 1.

The toner image carried on the transfer belt 3*a* and arrived at the transfer nip 5*n* is transferred (secondarily transferred) to a sheet P fed and conveyed from the cassette 8 by an electric field formed between the secondary transfer roller 5 and the opposing roller 3*b*.

After that, the sheet P is conveyed to the fixing unit 6 and subjected to thermal fixing processing. When the sheet P passes through the fixing nip 6*n*, the toner image on the sheet P is heated and pressed such that image toner (yellow, magenta, and cyan) and adhesion toner are melted and then fixed. Then, the toner image is fixed on the sheet P as a permanent image.

On the downstream side of the fixing nip 6*n* in the conveyance direction of the sheet P, an inversion flapper 21 as a guide member for switching the conveyance direction of the sheet P is installed. Owing to the inversion flapper 21, the conveyance direction of the sheet P is switched in accordance with a printing mode selected from a single-sided printing mode for forming an image on only one side of the sheet P and a both-sided printing mode for forming images on both sides of the sheet P.

In the single-sided printing mode, the inversion flapper 21 guides a sheet P toward the discharge roller pair 22. The sheet P guided by the inversion flapper 21 toward the discharge roller pair 22 is arrived at the post-processing apparatus 4 through an intermediate conveyance unit 26 having conveyance roller pairs 24 and 25, and a series of image forming operation by the image forming apparatus 1 is finished.

In the both-sided printing mode, the inversion flapper 21 conveys a sheet P having an image formed on one side thereof toward a switch-back roller pair 23. The switch-back roller pair 23 changes its rotation direction to a reverse direction after the sheet P is delivered until a trailing end, thereby conveying the sheet P toward a both-sided conveyance path 27 for both-sided printing.

The sheet P conveyed to the both-sided conveyance path 27 passes again through the secondary transfer portion and the fixing unit 6. Through this process, an image is formed on a surface of the sheet P on which no image has been formed, so that images are formed on both sides of the sheet P.

The sheet P having images formed on both sides thereof is conveyed by the inversion flapper 21 toward the discharge roller pair 22. Through the operation described above, a series of image forming operation by the image forming apparatus 1 is finished, and the sheet P is conveyed to the post-processing apparatus 4 through the intermediate conveyance unit 26.

The post-processing apparatus 4 in Example 1 has a floor standing type configuration. The post-processing apparatus 4 includes a conveyance mechanism for conveying a sheet P, a sheet alignment portion (alignment mechanism) provided at a lower part of the apparatus, and a booklet making apparatus 50 having a thermocompression unit 60 for heating and pressing a bundle of aligned sheets for a predetermined time. The booklet making apparatus 50 is a sheet thermocompression apparatus for heating and pressing a bundle of aligned sheets such that a plurality of sheets bonded to one another.

Post-Processing Apparatus Subsequently, operation of the post-processing apparatus 4 is described. In the post-processing apparatus 4, a discharge upper tray 33 and a discharge lower tray 34 located below the discharge upper tray 33 are provided as delivery destinations of sheets P.

When the delivery destination of a sheet P is the discharge upper tray 33, the sheet P conveyed from the intermediate conveyance unit 26 passes through a discharge roller pair 32 through a conveyance roller pair 30 and a conveyance roller pair 31 in the post-processing apparatus 4, and is discharged to the discharge upper tray 33.

When the delivery destination of a sheet P is the discharge lower tray 34, the inversion flapper 35 is switched at a timing at which a sheet trailing end (trailing end of sheet P in conveyance direction) has passed the inversion flapper 35, and at the same time, the rotation of the discharge roller pair 32 is stopped. After that, the discharge roller pair 32 is reversely rotated, and the sheet P is switched back and conveyed to a conveyance roller pair 36.

The sheet P conveyed from the conveyance roller pair 36 is conveyed to a conveyance roller pair 38 through an intermediate conveyance roller pair 37. At a predetermined timing after a trailing end of the sheet P has passed the intermediate conveyance roller pair 37, the conveyance roller pair 38 is stopped and reversely rotated such that the sheet P is conveyed to a booklet discharge roller pair 39 and discharged to the discharge lower tray 34.

Booklet Making Apparatus

Subsequently, the booklet making apparatus 50 is described. Sheets P that constitute a booklet are conveyed to the conveyance roller pair 38 through the intermediate conveyance roller pair 37, and conveyed to an intermediate loading portion 51 in the booklet making apparatus 50.

A vertical alignment reference plate 52 is disposed at the most downstream part of the intermediate loading portion 51. When end portions of the sheets P are brought into contact with the vertical alignment reference plate 52, the plurality of sheets P are aligned as a bundle.

An alignment method for sheets P is described with reference to FIGS. 2A to 2D. FIGS. 2A to 2D are explanatory diagrams of the alignment method for sheets P by the booklet making apparatus 50, and are diagrams of the intermediate loading portion 51 viewed from a direction perpendicular to the placement surface of the sheet P. In the following description, a vertical direction as a conveyance direction of sheets P by the conveyance roller pair 38 is referred to as "Y direction", a horizontal direction is referred to as "X direction", and a loading direction (height direction of bundle of sheets) in which sheets P are loaded is referred to as "Z direction".

Figures 2A, 2B, 2C, 2D:
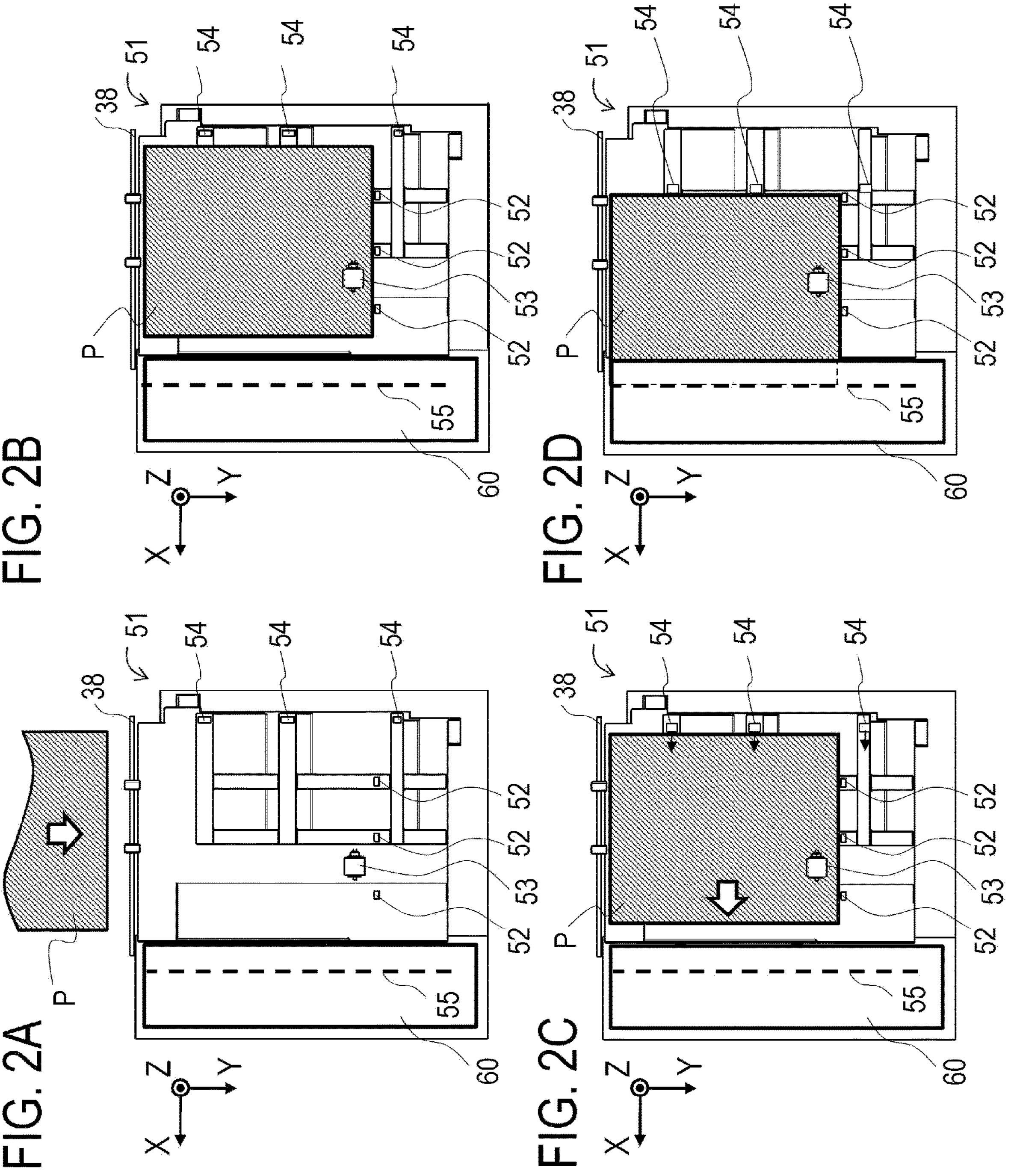
FIGS. 2A to 2D are explanatory diagrams of a sheet alignment method according to Example 1.

FIG. 2A illustrates how a sheet P is conveyed to the intermediate loading portion 51. The sheet P is conveyed to the intermediate loading portion 51 by the conveyance roller pair 38. The conveyance direction of the sheet P in this case is the vertical direction (Y direction).

FIG. 2B illustrates how an end portion of the sheet P in the longitudinal direction (Y direction) contacts the vertical alignment reference plate 52. The sheet P that has passed the conveyance roller pair 38 and been loaded in the intermediate loading portion 51 is conveyed by an alignment roller 53 such that a leading end of the sheet P contacts the vertical alignment reference plate 52.

FIG. 2C illustrates how the sheet P is pressed to a horizontal alignment reference plate 55 provided to the intermediate loading portion 51. The sheet P that has contacted the vertical alignment reference plate 52 is pressed to the left side in FIG. 2C toward the horizontal alignment reference plate 55 by horizontal alignment craws 54 that are placed movably in the X direction.

FIG. 2D illustrates how an end portion of the sheet P in a lateral direction (X direction) orthogonal to the longitudinal direction contacts the horizontal alignment reference plate 55. The sheet P that has been pressed to the left side in FIG. 2C by the horizontal alignment craw 54 is brought into contact with a reference surface of the horizontal alignment reference plate 55 indicated by a dotted line in FIG. 2C, and is then loaded in the intermediate loading portion 51 while sheets P are accurately aligned both in the horizontal direction and in the vertical direction.

Through the operation described above, a bundle of sheets (plurality of sheets P) that have been accurately aligned with reference to the vertical alignment reference plate 52 and the horizontal alignment reference plate 55 are placed in the intermediate loading portion 51. The bundle of aligned sheets are subjected to a thermocompression step involving heating and pressing by the thermocompression unit 60, and become a single booklet in which the sheets P bonded to one another with the adhesion toner images Ti as adhesive. In this manner, the booklet making apparatus 50 functions as a sheet thermocompression apparatus for causing a plurality of sheets P to bonded to one another by the thermocompression unit 60. Note that the alignment mechanism for aligning the sheets P loaded in the intermediate loading portion 51 is not limited to the above-mentioned configuration, and a publicly known alignment mechanism can be employed.

Thermocompression Unit

Figure 3:
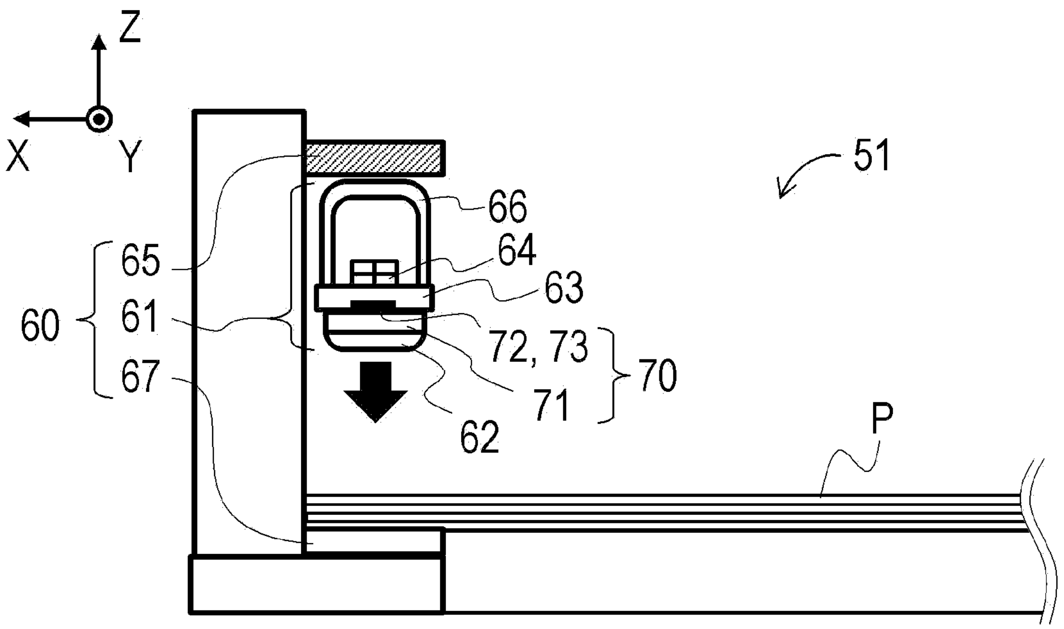
FIG. 3 is a schematic cross-sectional diagram of a thermocompression unit according to Example 1.

The thermocompression unit 60 is described. FIG. 3 is a schematic cross-sectional diagram illustrating a schematic configuration of the thermocompression unit 60 when the thermocompression unit 60 is viewed in the Y direction. The thermocompression unit 60 has a heating unit 61 including a ceramic heater 70 and a first pressure plate 62, a pressure lever 65 for pressing and moving the heating unit 61, and a second pressure plate 67 that constitutes a part of a sheet loading surface of the intermediate loading portion 51.

The ceramic heater 70 is a heating source in which a heat generating element 72 as a first heat generating element and a heat generating element 73 as a second heat generating element are provided on a surface of a substrate 71 made of ceramic with a thickness of 1.0 mm. Note that the substrate 71 in the ceramic heater 70 may be a rigid member such as metal, in addition to ceramic. The first pressure plate 62 is in close contact with a downward surface of the ceramic heater 70, and the ceramic heater 70 heats the first pressure plate 62.

The first pressure plate 62 is a pressing member for heating and pressing a bundle of sheets loaded in the intermediate loading portion 51. The first pressure plate 62 in Example 1 is made of aluminum with a thickness of 1.5 mm. For the first pressure plate 62, a material having small heat capacity and high heat conductivity in order to efficiently transmit heat from the ceramic heater 70 and having an elastic modulus of 1,000 Pa or more so as not to be deformed by a pressing force during thermocompression is preferred. More preferably, a highly elastic material with an elastic modulus of 10,000 Pa or more is used for the first pressure plate 62. By using a member with low heat capacity for the constituent member of the thermocompression unit 60 such as the first pressure plate 62, power consumption during the operation of thermocompression is reduced.

A heater support member 63 supports the ceramic heater 70 from the above. The heater support member 63 can be formed of, for example, a material such as a liquid crystal polymer, which is one of high heat resistant functional resins. The heater support member 63 is provided with a thermistor 64 as a temperature measurement sensor, and temperatures of the ceramic heater 70 and the first pressure plate 62 are measured through the heater support member 63.

By controlling the amounts of heat generation of the heat generating elements 72 and 73 such that temperatures of the heat generating elements 72 and 73 become a target thermocompression control temperature on the basis of a temperature detected by the thermistor 64, a surface temperature of the first pressure plate 62 is controlled by the ceramic heater 70 to a temperature with which thermocompression can be executed. In the booklet making apparatus 50, a control unit 90 for controlling the amounts of heat generation of the heat generating elements 72 and 73 on the basis of a measurement result of the thermistor 64 is provided. The control unit 90 may be capable of executing only the control of the thermocompression unit 60, or may be capable of controlling operations of the rollers in the post-processing apparatus 4 as well.

The heating unit 61 configured by the heater support member 63, the ceramic heater 70, and the first pressure plate 62 is integrally pressed toward a bundle of sheets by the pressure lever 65. The above-mentioned members are electrically connected to one another and arranged in the order of the first pressure plate 62, the ceramic heater 70, and the heater support member 63 from the sheet P.

The pressure lever 65 is a movement mechanism located above the heating unit 61 and configured to receive power from a drive source (not shown) to press the heating unit 61 toward sheets P (sheet loading surface of intermediate loading portion 51) in the −Z direction (downward direction in FIG. 3). Furthermore, the pressure lever 65 is biased by a spring member (not shown) in a direction of separating from the sheets P, and stands by at a position away from the sheet P except for the thermocompression operation.

A metal stay 66 as a rigid member is provided on a surface of the heater support member 63 on a side opposite to its connection surface for the ceramic heater 70. The pressing force of the pressure lever 65 is transmitted to the first pressure plate 62 through the metal stay 66.

Furthermore, a second pressure plate 67 is provided at a position overlapping the first pressure plate 62 in the Z direction and below a bundle of sheets. When the pressure lever 65 is operated by a drive source (not shown), the first pressure plate 62 contacts a bundle of sheets conveyed between the first pressure plate 62 and the second pressure plate 67, and the bundle of sheets are sandwiched and pressed by the first pressure plate 62 and the second pressure plate 67.

The second pressure plate 67 is a plate-shaped member formed of silicon rubber with a thickness of 2.0 mm, and is a member for stably transmitting a pressing force from the pressure lever 65 to a bundle of sheets. For the second pressure plate 67, a heat resistant material having an elastic modulus of 1,000 Pa or less with some degree of deformability and having resistance to repeated stress can be used as a member for stably transmitting a pressing force to a bundle of sheets, without being limited to silicon rubber.

It is desired that the number of sheets P to be thermally compressed be set as appropriate in consideration of a time necessary for the thermocompression step and producibility of booklet making. In Example 1, the thermocompression unit 60 is controlled to thermally compress a bundle of 5 sheets P loaded and aligned. In Example 1, in the state in which the temperature of the first pressure plate 62 is set to a target temperature for thermocompression, the first pressure plate 62 presses the bundle of sheets for 2 seconds and is thereafter separated from the sheets P, so that the booklet making by thermocompression is finished. Note that, in the case of thermally compressing a bundle of 5 sheets or less, thermocompression is executed for that number of sheets.

For example, a booklet with 18 sheets P is made in the following process. First, as the first thermocompression, thermocompression operation is performed in the state in which the first to fifth sheets P are loaded in the intermediate loading portion 51. In the first thermocompression, a booklet with 5 sheets P is made.

Subsequently, as the second thermocompression, thermocompression operation is executed in the state in which the sixth to tenth sheets P are loaded on a booklet of 5 sheets P. In the second thermocompression operation, a booklet with 10 sheets P is made.

Subsequently, as the third thermocompression, thermocompression operation is executed in the state in which the eleventh to fifteenth sheets P are loaded on a booklet of 10 sheets P. In the third thermocompression operation, a booklet with 15 sheets P is made.

Finally, as the fourth thermocompression, thermocompression operation is executed in the state in which the sixteenth to eighteenth sheets P are loaded on a booklet of 15 sheets P. In the fourth thermocompression operation, a booklet with 18 sheets P is made. Through the four thermocompression operations described above, a booklet with 18 sheets P is completed.

Positional Relation Between Recording Material and Ceramic Heater

Figure 4:
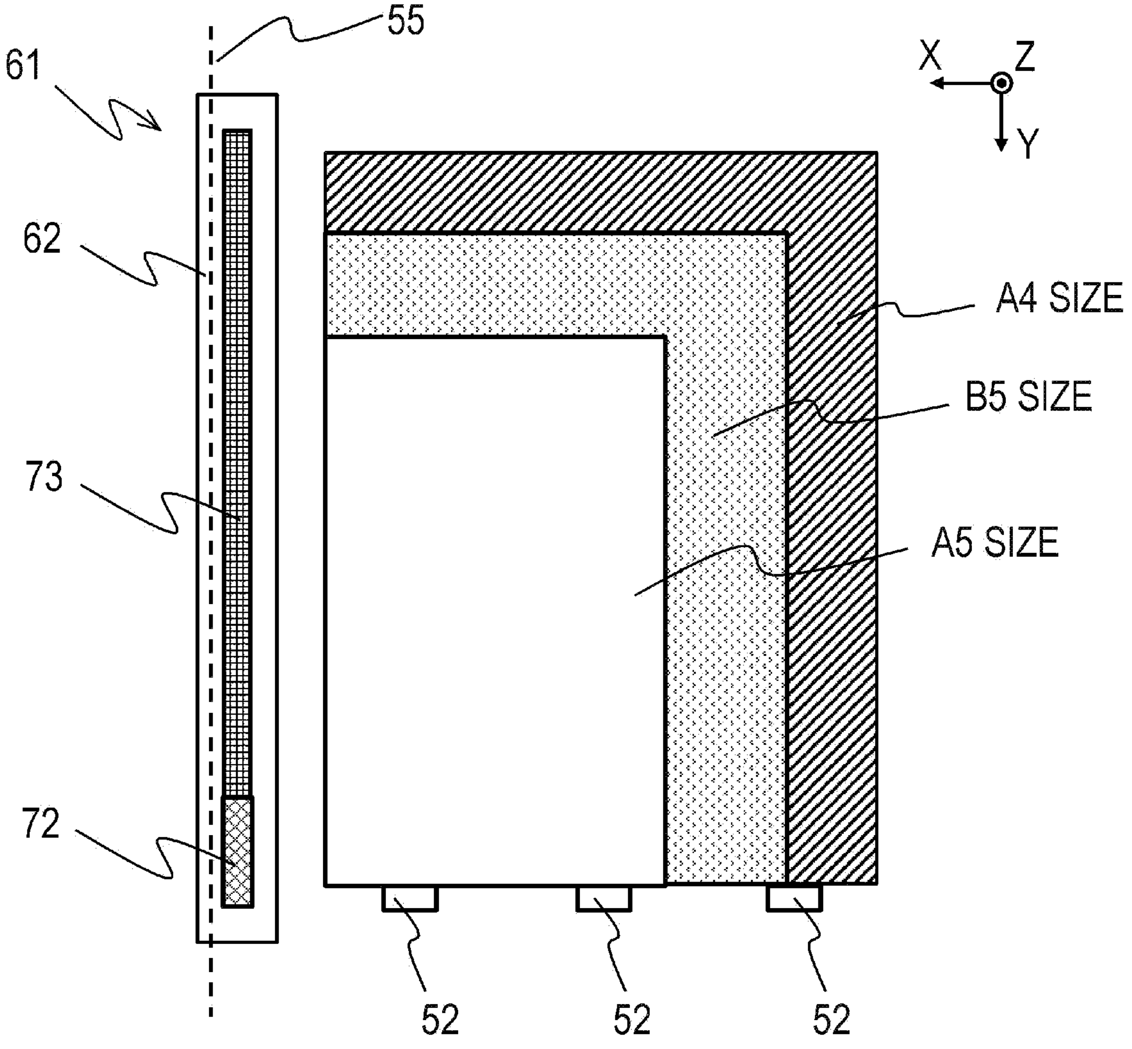
FIG. 4 is a diagram illustrating a position relation between a ceramic heater and recording materials according to Example 1.

A positional relation between sheets P aligned by the vertical alignment reference plate 52 and the ceramic heater 70 is described with reference to FIG. 4. FIG. 4 is an explanatory diagram illustrating the positional relation between the vertical alignment reference plate 52 and the ceramic heater 70. Furthermore, in FIG. 4, a reference surface of the horizontal alignment reference plate 55 is indicated by a dotted line.

The size of sheets P for a booklet is freely selected by a user, and there are various sizes. FIG. 4 illustrates sheets P of A4 size, B5 size, and A5 size as an example of sheets P of various sizes. Regardless of the sizes of sheets P, the positions of the sheets P in the Y direction are aligned at a reference alignment position by the vertical alignment reference plate 52, and the positions in the X direction are aligned at a reference alignment position by the horizontal alignment reference plate 55, and the sheets P stand by for a thermocompression step. In this case, the sheets P are aligned on one side thereof along the longitudinal direction of the ceramic heater 70 (first pressure plate 62).

In Example 1, the alignment positions of the sheets P to be thermally compressed are the same position regardless of the size. A reference position in the ceramic heater 70 is determined with reference to the arrangement positions of the vertical alignment reference plate 52 and the horizontal alignment reference plate 55. Sheets P loaded in the intermediate loading portion 51 are positioned by the vertical alignment reference plate 52 and the horizontal alignment reference plate 55, and hence the sheets P are accurately positioned with respect to the ceramic heater 70 regardless of the sizes of the sheets P.

In Example 1, the length of the first pressure plate 62 in the longitudinal direction is larger than the length of an A4 sheet, which is the maximum size, in the longitudinal direction. When viewed in the loading direction (Z direction) of sheets P, the alignment mechanism aligns the sheets P such that the first pressure plate 62 overlaps from one end portion to the other end portion of the sheet P and covers the entire region of an edge portion of the sheet P in the longitudinal direction. Similarly, the longitudinal lengths of the heat generating element 72 and the heat generating element 73 are determined such that the entire longitudinal region of an edge portion of the sheet P is covered by the heat generating element 72 and the heat generating element 73. In this manner, the first pressure plate 62 is capable of pressing the sheet P from one end portion to the other end portion in the longitudinal direction, and hence the displacement of the sheet P during the thermocompression operation is suppressed such that stable thermocompression operation is executed, and the quality of a booklet made is improved.

Adhesion Forms

The booklet making apparatus 50 in the first embodiment is capable of executing at least corner adhesion and line adhesion as adhesion forms of sheets P. The corner adhesion is a method for making a booklet by controlling a plurality of sheets P to bonded to one another at one corner of four corners of the sheets P. The line adhesion is a method for making a booklet by controlling a plurality of sheets P to bonded to one another at an edge portion along one side of the sheet P. The control unit 90 in the first embodiment can execute, on the basis of input information from a user, a first mode for executing the thermocompression operation under adhesion conditions for corner adhesion and a second mode for executing the thermocompression operation under adhesion conditions for line adhesion in a switching manner.

Figure 5B:
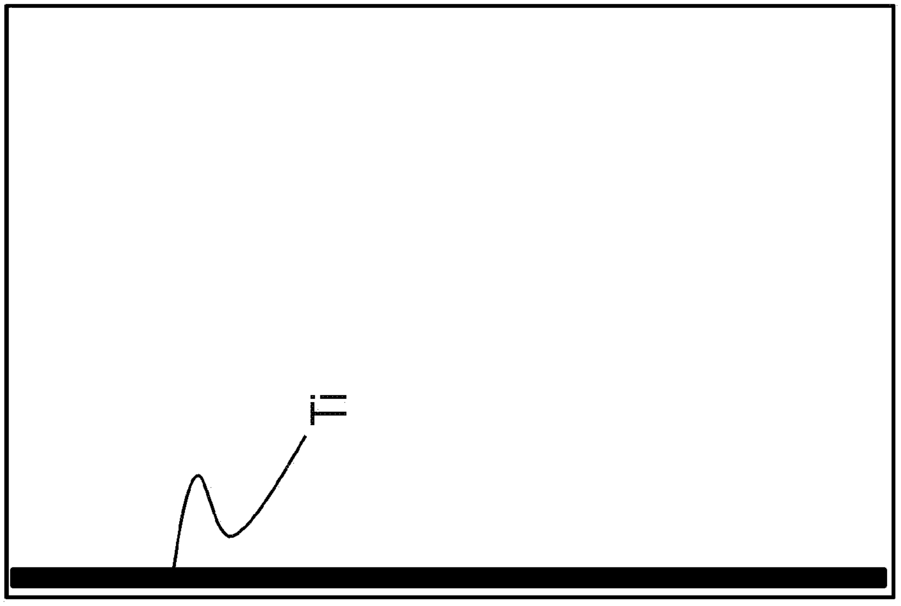
FIGS. 5A and 5B are explanatory diagrams of adhesion toner images according to Example 1.
Figure 5A:

The adhesion toner image Ti formed on a sheet P is described. FIGS. 5A and 5B are explanatory diagrams illustrating adhesion toner images Ti with different shapes. FIG. 5A illustrates an adhesion toner image Ti formed at one corner of four corners of the sheet P, which is used for corner adhesion where corner portions of the sheet P are bonded. FIG. 5B illustrates an adhesion toner image Ti formed at an edge portion along a long side of the sheet P, which is used for line adhesion where edge portions of the sheet P are bonded.

For example, in the case of making a booklet with n pages, adhesion toner images Ti are formed on sheets P until the n-th page except for the first page as a front page. Then, in the state in which the sheets P are loaded with five sheets each, the thermocompression operation is executed to complete a booklet. Note that, in FIGS. 5A and 5B, each of the adhesion toner images Ti formed on one side of the sheet P is illustrated as an example, but each of the adhesion toner images Ti may be formed on both sides of the sheet P. In other words, a booklet may be made in a manner that, when a plurality of sheets P are loaded, adhesion toner images Ti are formed on opposing surfaces of two sheets P adjacent in the loading direction.

Whether to form the adhesion toner image Ti on only one side of the sheet P or on both sides of the sheet P may be selected in consideration of the types of the booklet making apparatus 50, adhesion toner, and sheets P and functions required for a booklet. For example, adhesion toner images Ti may be formed on both sides in order to obtain reliable adhesiveness in the case where a booklet is used as a collector's edition or in the case where thick paper or a special sheet P is used as a front page of a booklet. For a simple booklet for temporal use, an adhesion toner image Ti may be formed on only one side.

A booklet completed by repeating the thermocompression step described above is pushed from the booklet delivery port 40 to the outside of the post-processing apparatus 4 as illustrated in FIG. 1 when a bundle delivery guide (not shown) moves in parallel in a direction of the booklet delivery port 40 from a standby position.

The booklet delivery port 40 is provided with a booklet discharge roller pair 39, and at a timing at which a leading end of a completed booklet is beyond the booklet discharge roller pair 39, the bundle delivery guide is stopped and returns to the standby position. The booklet discharge roller pair 39 that has received the completed booklet from the bundle delivery guide delivers the booklet from the post-processing apparatus 4 to the discharge lower tray 34, and a series of booklet making operations is finished.

Ceramic Heater

A detailed configuration of the ceramic heater 70 as a heating source for the thermocompression unit 60 is described with reference to FIGS. 6A to 6D. FIGS. 6A to 6D are explanatory diagrams of the ceramic heater 70.

Figure 6A:
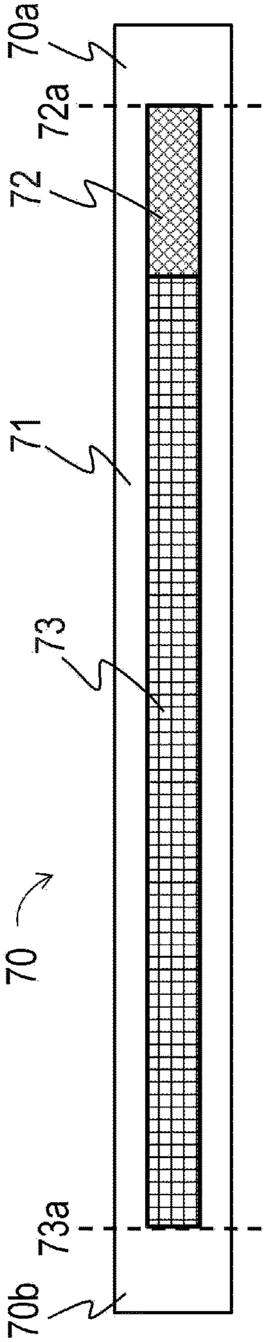
FIGS. 6A to 6D are explanatory diagrams of the ceramic heater according to Example 1.

FIG. 6A illustrates a positional relation between the substrate 71 and the heat generating elements 72 and 73 in the ceramic heater 70. The ceramic heater 70 is heated by the heat generating elements 72 and 73 provided on the substrate 71 made of ceramic. The heat generating elements 72 and 73 are resistive heat generating elements of which resistance values are adjusted such that temperatures thereof are increased by energization. The heat generating elements 72 and 73 are each formed to be long in the longitudinal direction of the ceramic heater 70 (substrate 71).

The heat generating elements 72 and 73 are arranged side by side in the longitudinal direction of the ceramic heater 70 and are controlled to generate heat independently. In other words, heat generating means in the ceramic heater 70 is configured by the heat generating elements 72 and 73 of two systems. Owing to such a configuration, the booklet making apparatus 50 can thermally compress the sheets P by the heating unit 61 while changing the amounts of heat generation of the heat generating elements 72 and 73 in accordance with the adhesion form (corner adhesion or line adhesion) for making a booklet and adhesion conditions such as the type of sheet. In the following description, a longitudinal direction end portion of the ceramic heater 70 on a side where the heat generating element 72 is located is referred to as "first end portion 70_a_", and a longitudinal direction end portion of the ceramic heater 70 on a side opposite to the first end portion 70_a_ is referred to as "second end portion 70_b_".

In FIGS. 6A to 6D, the positions of one end 72_a_ of the heat generating element 72 and one end 73_a_ of the heat generating element 73 in the longitudinal direction of the ceramic heater 70 are indicated by dotted lines. One end 72_a_ is an end of the heat generating element 72 on the first end portion 70_a_ side, and one end 73_a_ is an end of the heat generating element 73 on the second end portion 70_b_ side.

Figure 6B:
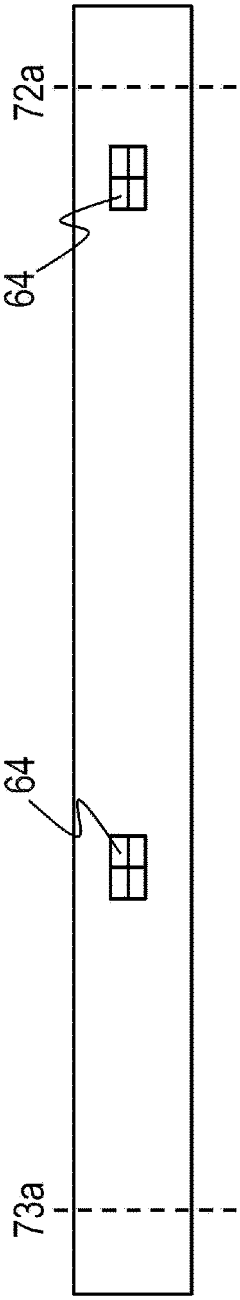

FIG. 6B illustrates arrangement positions of the thermistors 64 as temperature detection elements for detecting the temperature of the ceramic heater 70 through the heater support member 63. In Example 1, the heating unit 61 is provided with two thermistors 64, and one thermistor 64 is disposed correspondingly to the heat generating element 72 while the other thermistor 64 is disposed correspondingly to the heat generating element 73. Specifically, when viewed in a direction perpendicular to the surface of the substrate 71 on which the heat generating elements 72 and 73 are placed, the thermistor 64 as a first temperature measurement sensor is provided at a position overlapping the heat generating element 72, and the thermistor 64 as a second temperature measurement sensor is provided at a position overlapping the heat generating element 73. The control unit 90 controls energization to the heat generating element 72 on the basis of a detection temperature of the first temperature measurement sensor (thermistor 64), and controls energization to the heat generating element 73 on the basis of a detection temperature of the second temperature measurement sensor (thermistor 64), so that the temperatures of the heat generating elements 72 and 73 become a thermocompression temperature.

The heat generating element 72 is formed as a heat generating element used for adhesion in the case of corner adhesion, and is disposed at a position corresponding to a corner adhesion part of the sheet P. The heat generating element 72 is formed such that the length in the longitudinal direction is smaller than that of the heat generating element 73.

Figure 6C:
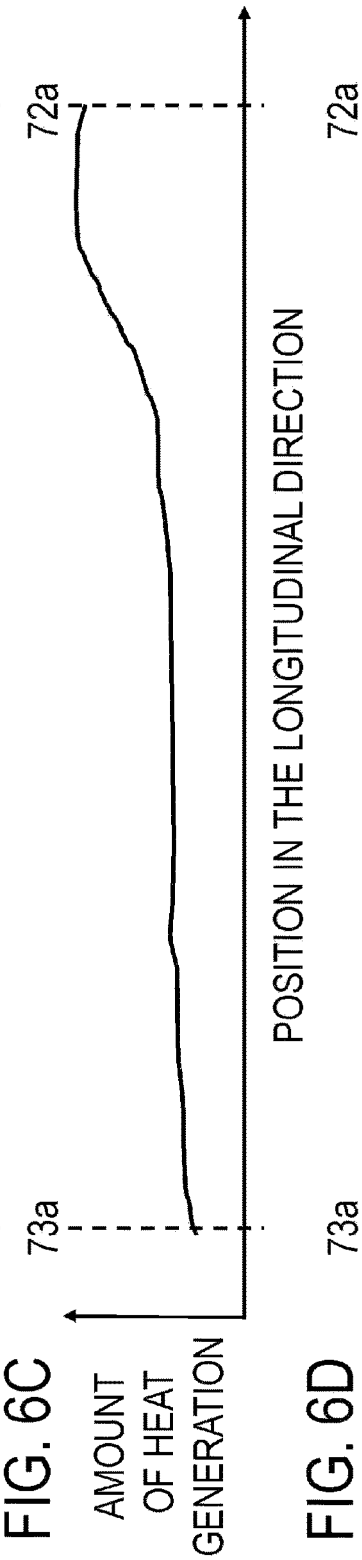
Figure 6D:
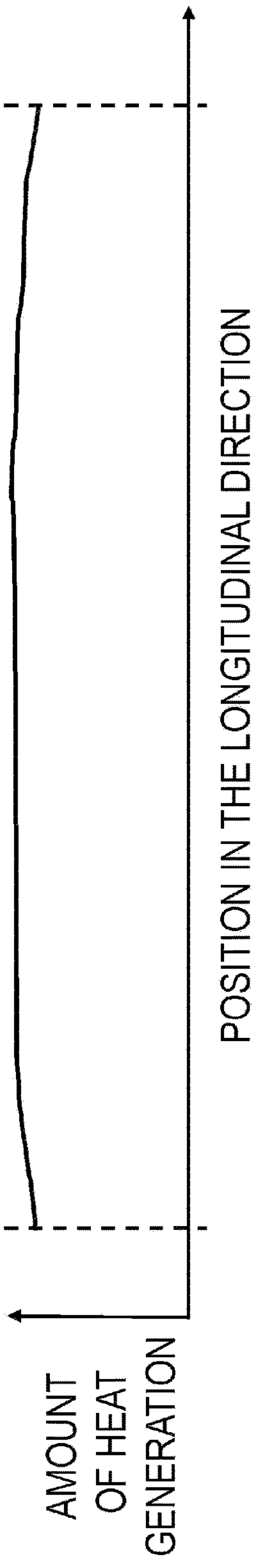

FIG. 6C is a graph illustrating a temperature distribution in the ceramic heater 70 in the longitudinal direction when only the heat generating element 72 generates heat. FIG. 6D is a graph illustrating a temperature distribution in the ceramic heater 70 in the longitudinal direction when the heat generating element 72 and the heat generating element 73 generate heat. The vertical axes of the graphs illustrated in FIGS. 6C and 6D indicate the amount of heat generation of the ceramic heater 70, and the horizontal axes indicate the position of the ceramic heater 70 in the longitudinal direction. The amount of heat generation of the ceramic heater 70 can be measured by, for example, a temperature measurement device such as a thermoviewer. Note that, in the graphs indicating the amount of heat generation in FIGS. 6C and 6D and the figures referred to later, the illustration of amounts of heat generation in the longitudinal direction at parts where no resistive heat generating element such as the heat generating elements 72 and 73 is provided is omitted.

In the case of corner adhesion, only the heat generating element 72 generates heat, and as illustrated in FIG. 6C, the amount of heat generation near the first end portion 70*a* at which the heat generating element 72 is provided is large. When only the heat generating element 72 generates heat, in the longitudinal direction of the ceramic heater 70, the amount of heat generation at a position corresponding to a corner adhesion part of the sheet P where the adhesion toner image Ti as illustrated in FIG. 5A is formed is large.

The heat generating element 73 is formed as a heat generating element used for adhesion in the case of line adhesion by being controlled to generate heat together with the heat generating element 72. In the case of line adhesion, both the heat generating elements 72 and 73 generate heat, and as illustrated in FIG. 6D, the amount of heat generation is large in substantially the entire region of the ceramic heater 70 in the longitudinal direction, and the amount of heat generation is substantially uniform in the longitudinal direction. When both the heat generating elements 72 and 73 generate heat, in the longitudinal direction of the ceramic heater 70, the amount of heat generation at a position corresponding to a line adhesion part of the sheet P where the adhesion toner image Ti as illustrated in FIG. 5B is formed is large.

Figure 7:
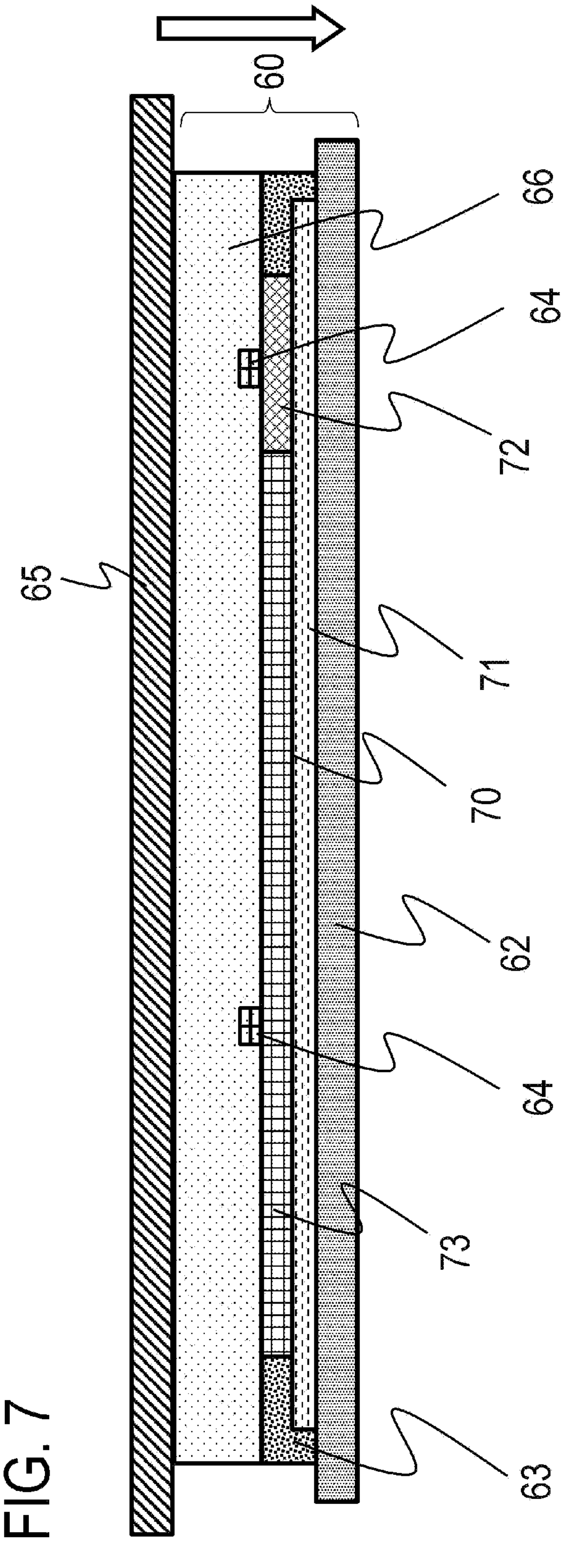
FIG. 7 is an explanatory diagram of the thermocompression unit according to Example 1.

FIG. 7 is an explanatory diagram of pressing operation of the heating unit 61 by the pressure lever 65. In Example 1, the metal stay 66, the ceramic heater 70, and the first pressure plate 62 that constitute the heating unit 61 are pressed by the pressure lever 65 and integrally moved. Specifically, in the thermocompression operations for a plurality of adhesion forms such as corner adhesion and line adhesion, the operation of the pressure lever 65 to press the heating unit 61 is common. In other words, in the configuration in Example 1, it is not necessary to use different operations of the pressure lever 65 depending on adhesion forms, but the single heating unit 61 only needs to be used to press the sheet P regardless of adhesion forms. In this manner, the use of a simple configuration in which the thermocompression unit 60 is configured by the single heating unit 61 can improve the ease of maintenance and obtain operational stability during the thermocompression operation.

Furthermore, in Example 1, in the case of corner adhesion, the heat generating element 72 generates heat to partly heat a bundle of sheets, and the enter region of an edge part of the bundle of sheets is pressed by the first pressure plate 62. With such a configuration, the displacement of the sheet P during the thermocompression operation is suppressed, and the thermocompression operation is stably executed. Then, a plurality of sheets P bonded to one another while the positions of end faces of the sheets P are aligned, and a booklet with high quality having the end faces of the sheets P aligned is obtained.

Furthermore, in Example 1, in the case of corner adhesion, only the heat generating element 72 generates heat to mainly heat a corner part of the sheet P where the adhesion toner image Ti is formed. With such a configuration, power consumed for corner adhesion is reduced as compared to, for example, a configuration in which heat generating means of the heating source is configured by a single heat generating element and the amount of heat generation of the heating source is always uniform in the longitudinal direction.

Example 2

Next, Example 2 according to the present invention is described. Hereinafter, only a configuration in Example 2 different from the configuration in Example 1 is described. In the configuration in Example 2, the same parts in the image forming apparatus 1 and the post-processing apparatus 4 as those in the configuration in Example 1 are denoted by the same reference symbols, and descriptions thereof are omitted.

In Example 1, the entire edge part of sheets P is pressed by the heating unit 61 to align end faces of the sheets P constituting a booklet, thereby improving the quality of a finished product of a booklet. However, the quality required for a booklet is not limited to the alignment of the sheet P. Example 2 is different from Example 1 in that the adhesiveness of sheets P is improved to further improve the quality of a booklet.

Adhesiveness and Escape of Heat

Peeling of sheets P bonded as a booklet is not desirable, and rigid adhesiveness that less causes peeling of sheets P is required for thermocompression. As means for enhancing the adhesiveness, some methods such as a method for extending a period of the thermocompression step and a method for increasing the amount or adhesion area of adhesion toner are conceivable. However, although the method for extending a period of the thermocompression step is advantageous for adhesion, the producibility of booklet making decreases. Furthermore, the method for increasing the amount of adhesion toner or increasing the area thereof is advantageous for adhesiveness, but the amount of use of adhesion toner increases to affect the cost of booklet making.

In order to obtain adhesiveness necessary for a booklet, the following facts have been found from earnest studies by the inventors of the present application. First, adhesion peels from an edge portion of an adhesion toner image Ti. In particular, peeling of a booklet by line adhesion is more likely to occur from both longitudinal end portions of the adhesion toner image Ti formed for line adhesion, and is less likely to occur from a longitudinal center portion. Furthermore, in the case of corner adhesion, the area of an adhesion toner image Ti is smaller than that in the case of line adhesion, and hence adhesiveness is low as compared to line adhesion, and it is difficult to obtain sufficient adhesiveness. In this manner, in both adhesion forms of line adhesion and corner adhesion, it is desired that sheets P firmly bonded at longitudinal direction end portions thereof.

Figure 8A:
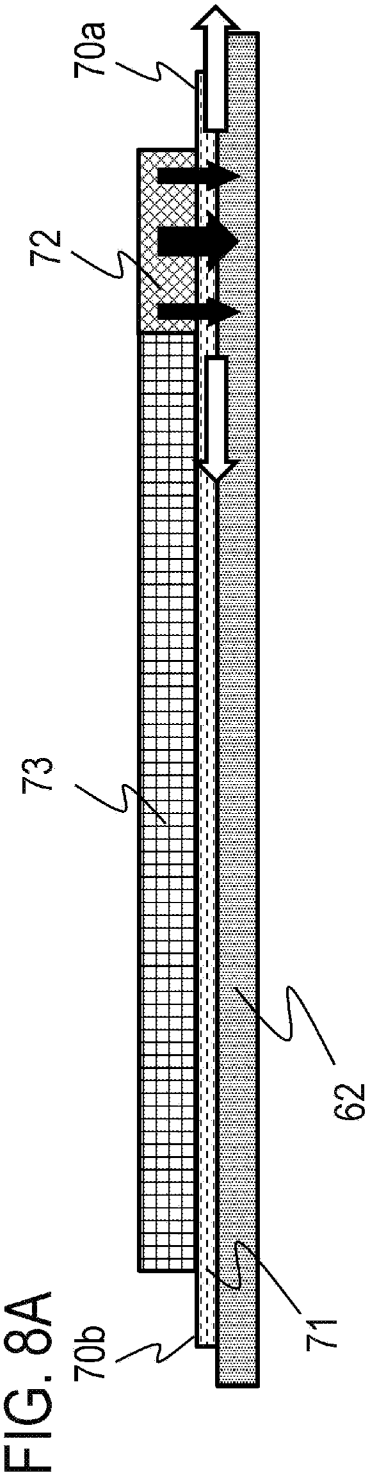
FIGS. 8A and 8B are explanatory diagrams of the flow of thermal energy generated by heat generating elements.
Figure 8B:
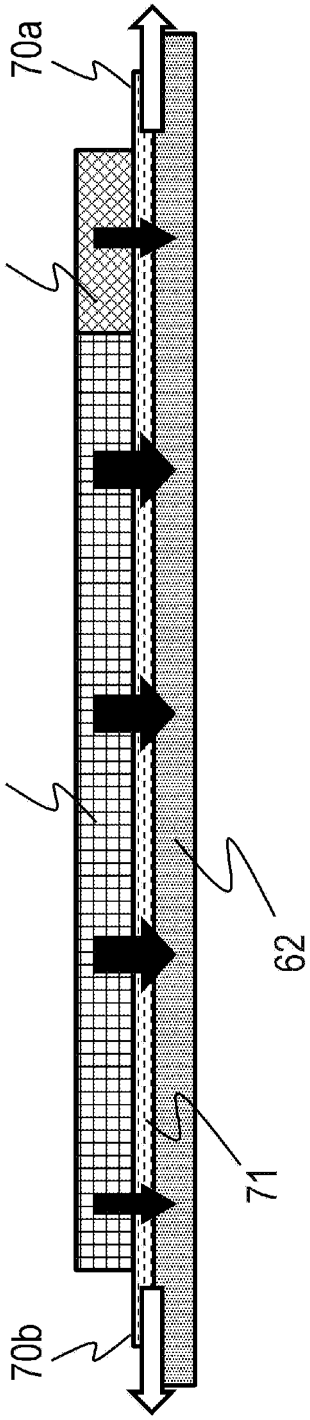

As a result of studying factors of peeling of an adhesion toner image Ti from an end portion, the following facts have been found. FIGS. 8A and 8B are explanatory diagrams of the flow of thermal energy (thermal flow) generated by the heat generating elements 72 and 73, and are image diagrams illustrating the flow of thermal energy. In FIGS. 8A and 8B, thermal flows of thermal energy flowing from the ceramic heater 70 to the first pressure plate 62 in order to melt the adhesion toner image Ti are indicated by solid arrows. The thicknesses of the solid arrows in FIGS. 8A and 8B indicate the amounts of thermal energy of thermal flows, and an arrow with a larger thickness indicates higher thermal energy. Furthermore, in FIGS. 8A and 8B, thermal flows of thermal energy that do not flow from the ceramic heater 70 to the first pressure plate 62 but flow in escaping directions are indicated by open arrows. The escape of heat may be a factor to hinder the increase of temperatures of the first pressure plate 62 and the sheet P, which is not preferred.

FIG. 8A illustrates the flow of thermal energy in the case of corner adhesion. In the case of corner adhesion, as illustrated in FIG. 8A, heat escapes to both ends of the heat generating element 72 in the longitudinal direction (left-right direction in FIGS. 8A and 8B). In the case of corner adhesion, only the heat generating element 72 generates heat but the heat generating element 73 does not generate heat, and hence a temperature difference occurs between the heat generating elements 72 and 73. Due to the temperature difference, heat escapes in a direction from the heat generating element 72 having a higher temperature toward the heat generating element 73 having a lower temperature. Furthermore, the heat generating element 72 generates heat at a temperature higher than an environment temperature around the ceramic heater 70, and hence heat escapes from the heat generating element 72 toward the first end portion 70*a* to the outside of the ceramic heater 70. In this manner, in the case of corner adhesion, the thermal flow that escapes from the heat generating element 72 toward the first end portion 70*a* and the thermal flow that escapes therefrom toward the second end portion 70*b* occur. When heat escapes to a part with low temperature during the thermocompression operation, a thermal flow necessary for melting the adhesion toner image Ti is lost, which may decrease the strength of adhesion in a booklet.

FIG. 8B illustrates the flow of thermal energy in the case of line adhesion. In the case of line adhesion, as illustrated in FIG. 8B, the heat generating element 73 generates heat in addition to the heat generating element 72, and hence the escape of heat in the direction from the heat generating element 72 toward the heat generating element 73 is eliminated. On the other hand, the heat generating elements 72 and 73 generate heat at a temperature higher than an environment temperature around the ceramic heater 70. Thus, in the case of line adhesion, the thermal flow that escapes from the heat generating element 72 toward the first end portion 70*a* to the outside of the ceramic heater 70 and the thermal flow that escapes from the heat generating element 73 toward the second end portion 70*b* to the outside of the ceramic heater 70 occur. Thus, also in the case of line adhesion, heat necessary for melting the adhesion toner image Ti is lost in the process of the thermocompression operation, which may decrease the strength of adhesion in a booklet.

As described above, when the escape of heat that impairs the melting of the adhesion toner image Ti occurs to decrease the temperatures of both end portions of the thermocompression unit 60 in the longitudinal direction, the thermal flows from the heat generating elements 72 and 73 to a bundle of sheets P reduce to decrease the adhesiveness. As illustrated in FIG. 8A, in the case of corner adhesion, the thermal flow toward the first pressure plate 62 from both end portions of the heat generating element 72 in the longitudinal direction is smaller than the thermal flow toward the first pressure plate 62 from the center portion of the heat generating element 72 in the longitudinal direction. Furthermore, as illustrated in FIG. 8B, in the case of line adhesion, the thermal flow toward the first pressure plate 62 from both end portions of the ceramic heater 70 in the longitudinal direction is smaller than the thermal flow toward the first pressure plate 62 from the center portion of the ceramic heater 70 in the longitudinal direction.

Furthermore, the degree of the escape of heat that causes the decrease in adhesiveness may change depending on conditions and environments where thermocompression is executed. For example, in the state in which the entire thermocompression unit 60 is cooled, a temperature difference between the heat generating elements 72 and 73 that increase their temperatures for thermocompression and other members in the thermocompression unit 60 is large, and hence the amount of the escape of heat is large. On the other hand, in the case where the thermocompression operation is repeatedly executed and the entire thermocompression unit 60 is warmed, a temperature difference between the heat generating elements 72 and 73 and the other members is small, and the amount of the escape of heat is small.

Furthermore, the amount of the escape of heat also changes depending on an environment temperature where the thermocompression unit 60 is placed. As compared to the case where the thermocompression operation is executed under an environment where temperature is high, in the case where the thermocompression operation is executed under an environment where temperature is relatively low, the amount of the escape of heat increases to decrease the adhesiveness.

Ceramic Heater

Figure 9A:
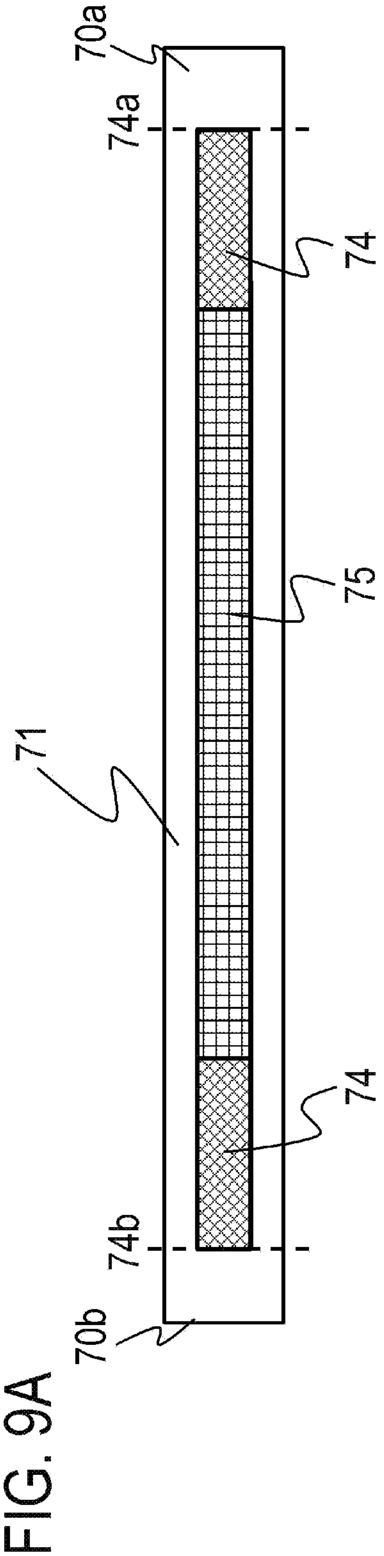
FIGS. 9A to 9C are explanatory diagrams of a ceramic heater according to Example 2.
Figure 9B:
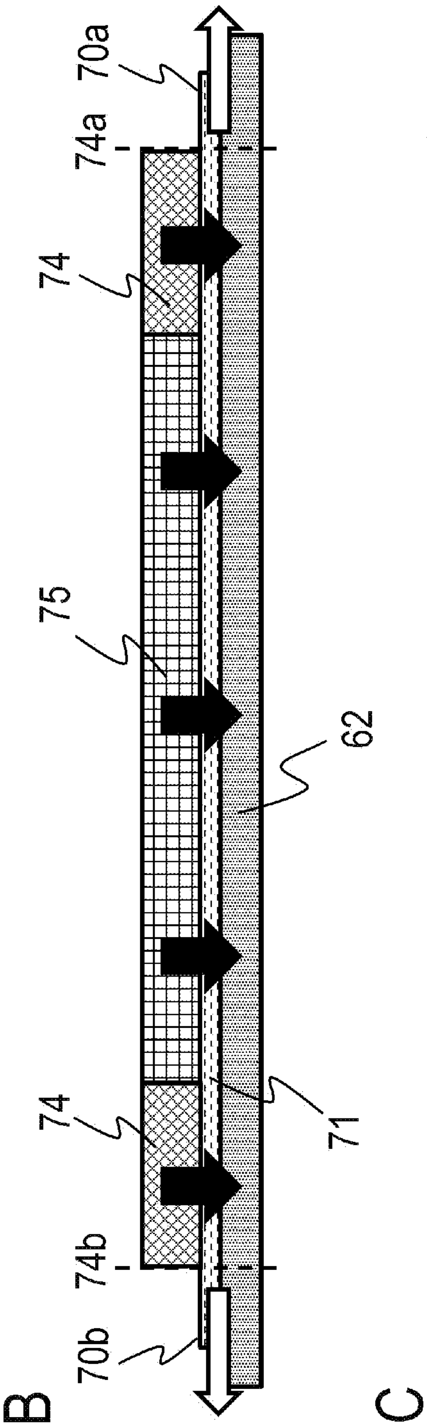
Figure 9C:
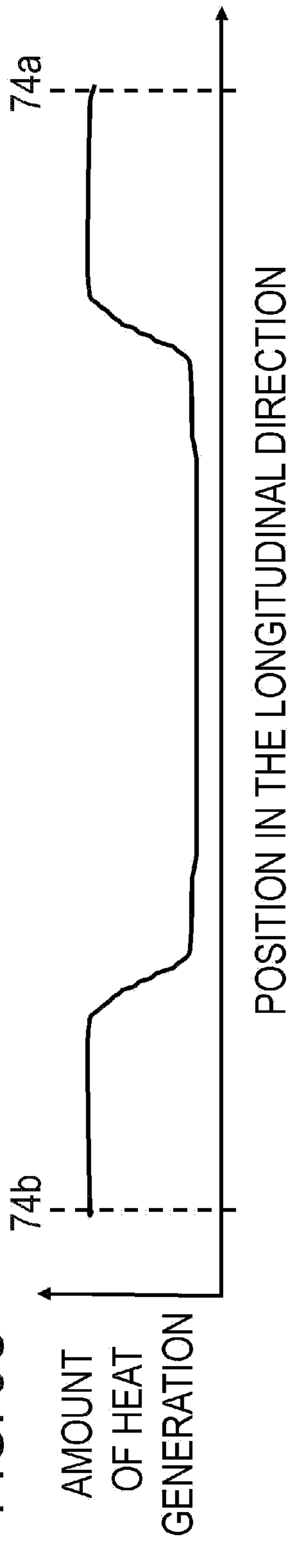

In Example 2, the decrease in adhesiveness of sheets P due to the escape of heat can be suppressed in consideration of the above-mentioned phenomenon. Next, a detailed configuration of a ceramic heater 70 as a heating source in Example 2 is described with reference to FIGS. 9A to 9C. FIGS. 9A to 9C are explanatory diagrams of the ceramic heater 70 according to Example 2. The ceramic heater 70 according to Example 2 is provided with end portion heat generating elements 74 located at both end portions in the longitudinal direction and a center portion heat generating element 75 located at a center portion.

FIG. 9A illustrates configurations of the end portion heat generating elements 74 and the center portion heat generating element 75 in the ceramic heater 70 according to Example 2. Heat generating means in the ceramic heater 70 is configured by the center portion heat generating element 75 disposed at the center portion in the longitudinal direction, and the two end portion heat generating elements 74 disposed on both sides of the center portion heat generating element 75 in the longitudinal direction and at both end portions in the longitudinal direction. In the ceramic heater 70, a plurality of resistive heat generating elements are disposed side by side in the longitudinal direction in the order of the end portion heat generating element 74 (first heat generating element), the center portion heat generating element 75 (second heat generating element), and the end portion heat generating element 74 (third heat generating element). In Example 2, the two end portion heat generating elements 74 are electrically connected, and currents with the same magnitude are caused to flow therethrough such that the amounts of heat generation are controlled to be equal to each other. On the other hand, the end portion heat generating elements 74 and the center portion heat generating element 75 are controlled independently from each other. The heat generating means in the ceramic heater 70 is configured by the heat generating elements of two systems.

In FIGS. 9A to 9C, the positions of one end 74*a* of the end portion heat generating element 74 on the first end portion 70*a* side of the ceramic heater 70 in the longitudinal direction and one end 74*b* of the end portion heat generating element 74 on the second end portion 70*b* side are indicated by dotted lines. The one end 74*a* is an end of the end portion heat generating element 74 on the first end portion 70*a* side of the ceramic heater 70, and the one end 74*b* is an end of the end portion heat generating element 74 on the second end portion 70*b* side of the ceramic heater 70. A longitudinal distance from the one end 74*a* to the one end 74*b* is equal to a longitudinal distance from the one end 72*a* to the one end 73*a* in Example 1.

In the configuration in which the end portion heat generating elements 74 and the center portion heat generating element 75 are independently controlled, the amounts of heat generation therefrom can be freely changed. Thus, Example 2 employs a configuration in which the end portion heat generating elements 74 are controlled to generate heat at a temperature higher than that of the center portion heat generating element 75 in order to compensate for the escape of heat from the end portions, which decrease the adhesiveness. Owing to such a configuration, temperatures at both end portions of the thermocompression unit 60 in the longitudinal direction are secured to obtain reliable adhesiveness at the end portions.

FIG. 9B illustrates the flow of thermal energy in the case of line adhesion by the thermocompression unit 60 according to Example 2. FIG. 9C is a graph illustrating a temperature distribution in the ceramic heater 70 in the longitudinal direction when the end portion heat generating elements 74 and the center portion heat generating element 75 generate heat. In Example 2, the amounts of heat generation of the end portion heat generating elements 74 are controlled to be higher than the amount of heat generation of the center portion heat generating element 75 such that the thermal flows from the ceramic heater 70 toward the first pressure plate 62 and the sheet P are uniform in the longitudinal direction. FIG. 9C illustrates the state in which the amounts of heat generation at both end portions of the ceramic heater 70 in the longitudinal direction are larger than the amount of heat generation at the center portion.

Heat Generation Control

A specific example of heat generation control of the ceramic heater 70 during thermocompression operation by the thermocompression unit 60 according to Example 2 is described. In Example 2, a control temperature T1 for thermocompression operation of the end portion heat generating element 74 in the case of line adhesion is set to be higher than a control temperature T2 for thermocompression operation of the center portion heat generating element 75, specifically, higher by 10° C. Then, in Example 2, the control temperature T1 of the end portion heat generating element 74 is adjusted depending on the warming state of the thermocompression unit 60 and the environment temperature. Hereinafter, a method for adjusting the control temperature T1 is described on the basis of a control example in which a temperature higher than the control temperature T2 of the center portion heat generating element 75 by 10° C. is set as the reference control temperature TO of the end portion heat generating element 74.

First, the adjustment of heat generation of the end portion heat generating element 74 depending on the warming state of the thermocompression unit 60 is described. The case where the thermocompression unit 60 is warmed is the case where the thermocompression step is repeated. Thus, in Example 2, the control temperature T1 of the end portion heat generating element 74 is adjusted as described below depending on the number of repetitions of the thermocompression step that is continuously repeated. Here, the number of repetitions of the thermocompression step refers to the number of repetitions of the thermocompression step within a single job (instruction), but when a plurality of jobs are continuously executed, the number of repetitions of the thermocompression step in the jobs may be added.

When the number of repetitions is 5 or less, the control temperature T1 is not changed (kept at reference control temperature T0).

When the number of repetitions is 6 to 9, the control temperature T1 is set to be lower than the reference control temperature T0 by 2° C.

When the number of repetitions is 10 to 14, the control temperature T1 is set to be lower than the reference control temperature T0 by 3° C.

When the number of repetitions is 15 to 19, the control temperature T1 is set to be lower than the reference control temperature T0 by 5° C.

When the number of repetitions is 20 to 31, the control temperature T1 is set to be lower than the reference control temperature T0 by 7° C.

When the number of repetitions is 31 or more, the control temperature T1 is set to be lower than the reference control temperature T0 by 10° C. (the control temperature T1 of the end portion heat generating element 74 is equal to the control temperature T2 of the center portion heat generating element 75).

Subsequently, the adjustment of heat generation of the end portion heat generating element 74 depending on the environment temperature where the thermocompression unit 60 is placed is described. The environment temperature is detected by an environment detection thermistor (not shown) for detecting the environment temperature that is provided to the image forming apparatus 1 or the post-processing apparatus 4. Then, the control unit 90 controls the control temperature T1 of the end portion heat generating element 74 in accordance with the detection temperature.

In Example 2, 25° C. is set as a reference environment temperature E0 where the thermocompression unit 60 is placed, and the control temperature T1 of the end portion heat generating element 74 is adjusted depending on a difference amount of the environment temperature with respect to the reference environment temperature E0. Specifically, when the environment temperature is larger than the reference environment temperature E0, the control temperature T1 of the end portion heat generating element 74 is adjusted to be low, and when the environment temperature is smaller than the reference environment temperature E0, the control temperature T1 of the end portion heat generating element 74 is adjusted to be large. In Example 2, the control temperature T1 of the end portion heat generating element 74 is increased or decreased by 2° C. in accordance with the increase or decrease of the environment temperature by 1° C.

When the thermocompression control temperature of the end portion heat generating element 74 is adjusted as described above, for example, if the thermocompression step is continuously repeated 15 times under an atmosphere temperature of 23° C., the control temperature T1 of the end portion heat generating element 74 is determined as follows.

First, the number of repetitions of the thermocompression step is 15, and hence, as described above, in consideration of the warming state of the thermocompression unit 60, the control temperature T1 is adjusted to be lower than the reference control temperature T0 by 5° C.

On the other hand, the environment temperature is 23° C., which is lower than the reference environment temperature E0 (25° C.) by 2° C., and hence the control temperature T1 is adjusted to be higher than the reference control temperature T0 by 2° C.×2=4° C.

A value obtained by adding the adjustment amount in consideration of the warming state of the thermocompression unit 60 and the adjustment amount in consideration of the environment temperature is set as a final adjustment amount of the control temperature T1 of the end portion heat generating element 74. In the above-mentioned operation example, the adjustment amount is −5° C.+4° C.=−1° C., and the control temperature T1 is set to a temperature lower than the reference control temperature T0 by 1° C.

As described above, the reference control temperature T0 is higher than the control temperature T2 of the center portion heat generating element 75 by 10° C. Thus, the control temperature T1 of the end portion heat generating element 74 is controlled to be a temperature higher than the control temperature T2 by 10° C.−1° C.=9° C.

As described above, with the configuration in Example 2, the heat generating elements that can be controlled independently from each other are disposed at the center portion and both end portions in the longitudinal direction, and the end portions and the center portion of the first pressure plate 62 in the longitudinal direction can be heated to different temperatures. Thus, the amounts of heat generation can be controlled so as to compensate for the escape of heat from both end portions of the thermocompression unit 60 in the longitudinal direction, and hence stable adhesiveness can be obtained to suppress the decrease in quality of a booklet. Note that the control method for the control temperature T1 and the relations among various temperatures described above are merely examples, and can be changed as appropriate depending on adhesion conditions such as the type of sheet.

Furthermore, in FIG. 9B, heat generation control in the case of line adhesion is illustrated, but in the case of corner adhesion, only the end portion heat generating elements 74 provided at both end portions of the ceramic heater 70 in the longitudinal direction generate heat. For example, when a corner part at which an adhesion toner image Ti is formed is located on the first end portion 70*a* side, in Example 2, the amount of heat generation at the corner part on the first end portion 70*a* side as well as the amount of heat generation at a corner part on the second end portion 70*b* side increases. Then, the temperature of the ceramic heater 70 on the second end portion 70*b* side of the first pressure plate 62 increases similarly to the first end portion 70*a* side. Thus, heat can be prevented from escaping from the end portion heat generating element 74 located on the first end portion 70*a* side to the second end portion 70*b* side, and stable adhesiveness can be obtained to suppress the decrease in quality of a booklet.

Furthermore, in the configuration in Example 2, in the case of corner adhesion, the center portion heat generating element 75 at the center can be controlled to generate heat at a temperature lower than the control temperature necessary for melting adhesion toner, thereby suppressing the escape of heat. Also in the case of such control, power consumed for corner adhesion is reduced as compared to, for example, a configuration in which heat generating means of the heating source is configured by a single heat generating element and the amount of heat generation of the heating source is always uniform in the longitudinal direction.

First Modification

Note that, in Example 2, the plurality of heat generating elements are provided such that temperatures at the center portion and the end portions of the ceramic heater 70 in the longitudinal direction are controlled to different temperatures, but the temperatures at the center portion and the end portions may be controlled to different temperatures by a single heat generating element. Next, a first modification of Example 2 in which a heat generating element of a single system is employed is described.

Figure 10A:
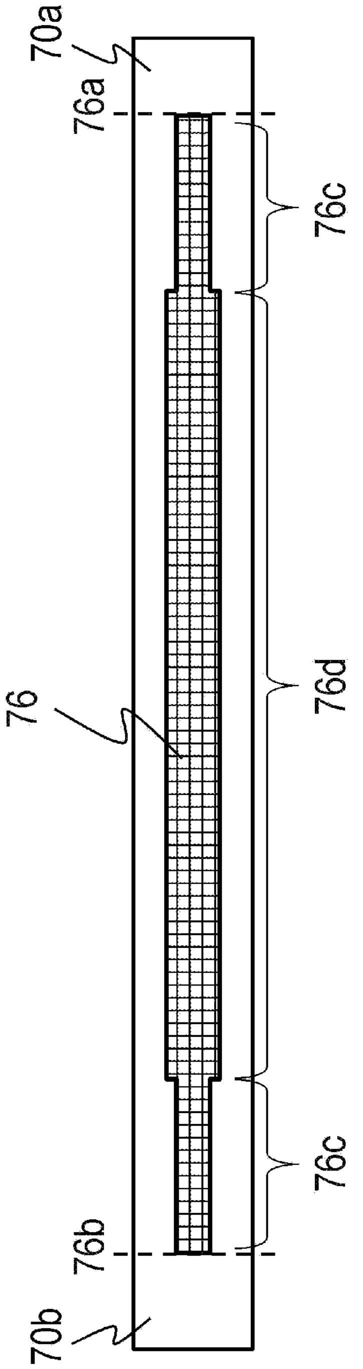
FIGS. 10A and 10B are explanatory diagrams of a ceramic heater according to a first modification of Example 2.
Figure 10B:
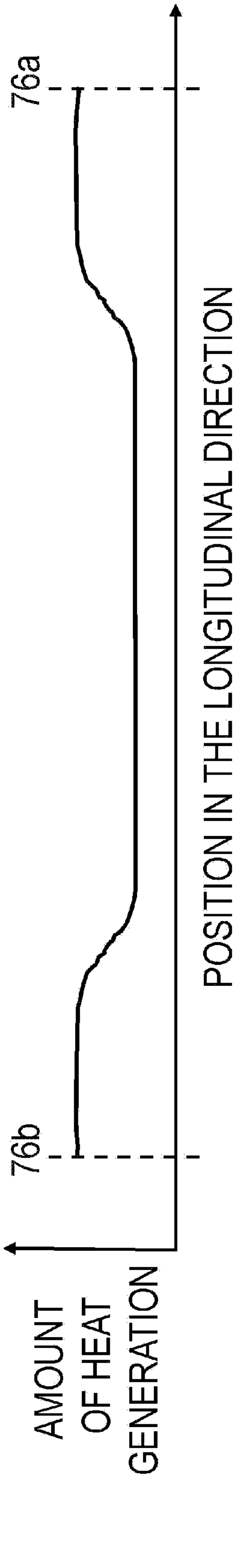

FIGS. 10A and 10B are explanatory diagrams of a ceramic heater 70 according to the first modification. FIG. 10A illustrates a configuration of a heat generating element 76 in the ceramic heater 70 according to the first modification. FIG. 10B is a graph illustrating a temperature distribution in the ceramic heater 70 in the longitudinal direction when the heat generating element 76 generates heat. In the first modification, one heat generating element 76 is provided to the ceramic heater 70. Then, the widths in the lateral direction of end portions 76*c* on both sides of the heat generating element 76 in the longitudinal direction are smaller than the width in the lateral direction of a center portion 76*d* in the longitudinal direction.

In FIGS. 10A and 10B, the positions of one end 76*a* of the heat generating element 76 on the first end portion 70*a* side in the longitudinal direction of the ceramic heater 70 and the other end 76*b* on the second end portion 70*b* side are indicated by dotted lines. A longitudinal distance from the one end 76*a* to the other end 76*b* is equal to the longitudinal distance from the one end 72*a* to the one end 73*a* in Example 1. The longitudinal direction position of the end portion 76*c* having a small width (thin) of the heat generating element 76 according to the modification corresponds to the end portion heat generating element 74 in Example 2, and the longitudinal direction position of the center portion 76*d* having a large width (thick) of the heat generating element 76 corresponds to the center portion heat generating element 75 in Example 2.

The amount of heat generation generated by a resistive heat generating element such as the heat generating element 76 is equivalent to power determined by a product of the square of a value of a current flowing through the resistive heat generating element and a resistance value of the resistive heat generating element. Thus, when the resistance value is large, the amount of heat generation is large, and when the resistance value is small, the amount of heat generation is also small.

The value of a current flowing through the heat generating element 76 of a single system as illustrated in FIG. 10A is the same in the longitudinal direction. On the other hand, the heat generating element 76 is formed by coating by screen printing of the same material in the longitudinal direction, and the thickness is equal in the longitudinal direction. In the resistive heat generating element having such a configuration, resistance values of both end portions 76*c* having small widths in the lateral direction are larger than a resistance value of the center portion 76*d* having a large width in the lateral direction. With such a configuration, the amounts of heat generation of the end portions 76*c* are larger than the amount of heat generation of the center portion 76*d* as illustrated in FIG. 10B.

As described above, with the configuration in the first modification, the ceramic heater 70 that can be simply configured by the resistive heat generating element of a single system can be used to heat the end portions and the center portions of the first pressure plate 62 in the longitudinal direction to different temperatures. In addition, the amounts of heat generation can be controlled so as to compensate for the escape of heat from both end portions of the thermocompression unit 60 in the longitudinal direction, thereby obtaining stable adhesiveness to suppress the decrease in quality of a booklet.

Note that, in the first modification, the widths of the end portion 76*c* and the center portion 76*d* in the lateral direction are uniform in the longitudinal direction, but the resistive heat generating element may be formed by a tapered shape in which the width gradually changes in the longitudinal direction. Also in such a configuration, the end portions and the center portion of the first pressure plate 62 in the longitudinal direction can be heated to different temperatures, and the amounts of heat generation can be controlled so as to compensate for the escape of heat from both end portions of the thermocompression unit 60 in the longitudinal direction, thereby suppressing the decrease in quality of a booklet.

The present modification cannot implement control such that only an end portion in the longitudinal direction generates heat, and is thus suitable for, for example, the booklet making apparatus 50 that executes only line adhesion. In this manner, which of the configurations in Example 1, Example 2, and the modifications thereof is employed may be selected as appropriate depending on specifications of a booklet making apparatus.

Example 3

Next, Example 3 according to the present invention is described. Hereinafter, only a configuration in Example 3 different from the configuration in Example 2 is described. In the configuration in Example 3, the same parts in the image forming apparatus 1 and the post-processing apparatus 4 as those in the configurations in Example 1 and Example 2 are denoted by the same reference symbols, and descriptions thereof are omitted.

In Example 2, the escape of heat from both end portions of the thermocompression unit 60 is compensated for by increasing the amounts of heat generation of the end portion heat generating elements 74 that can be independently controlled, so that reliable adhesiveness at end portions is obtained. With such a configuration, there may be a case where a thermocompression step is executed in a state in which a temperature difference occurs between the end portion heat generating element 74 and the center portion heat generating element 75. The end portion heat generating element 74 and the center portion heat generating element 75 each thermally expand, and hence due to a difference in expansion caused by a difference in temperature between the heat generating elements, thermal stress may occur at a boundary between the end portion heat generating element 74 and the center portion heat generating element 75.

The ceramic heater 70 is created by coating and baking of a resistive heat generating element on the surface of the substrate 71, and is configured to generate heat when voltage is applied to the resistive heat generating element. It is necessary for the resistive heat generating element to secure electrical insulation because voltage is applied thereto. Thus, in the ceramic heater 70, insulating glass with thermal resistance is formed as an insulating protective layer (insulating glass layer) with a thickness of 50 m.

A difference in thermal stress caused by thermal expansion is received by the substrate 71 and the insulating glass layer. The substrate 71 has a thickness of 1 mm and has high rigidity, and is thus less likely to be broken by thermal stress. On the other hand, the insulating glass layer is a thin film of 50 μm, and hence when the insulating glass layer repeatedly receives thermal stress, very small microcracks may occur. Such microcracks may cause a problem in securing electrical insulation.

Thus, Example 3 employs a configuration in which a ceramic heater 70 is configured by a plurality of resistive heat generating elements such that the amounts of heat generation can be controlled so as to compensate for the escape of heat from both end portions of the thermocompression unit 60 in the longitudinal direction while suppressing microcracks in the insulating glass layer and the like. In the ceramic heater 70 according to Example 3, one heat generating element 77 and two heat generating elements 78 are provided.

Figure 11A:
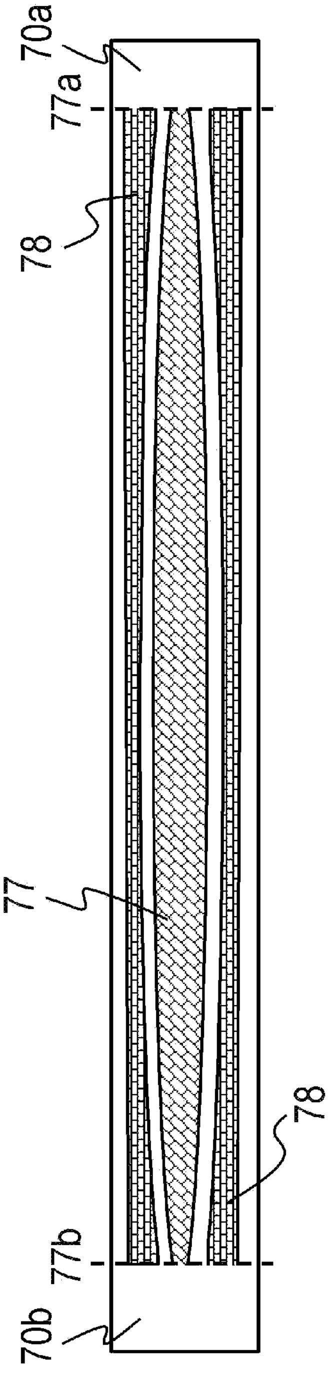
FIGS. 11A to 11C are explanatory diagrams of a ceramic heater according to Example 3.
Figure 11B:
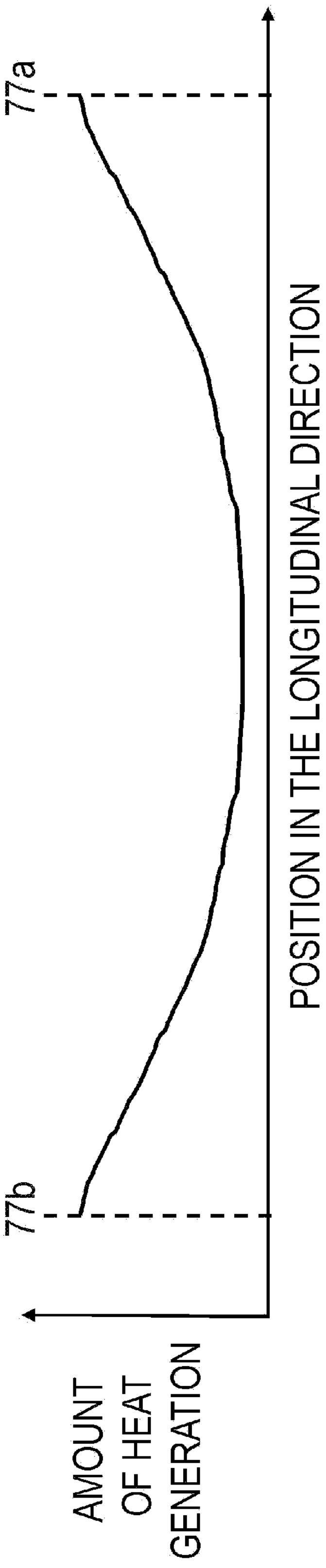
Figure 11C:
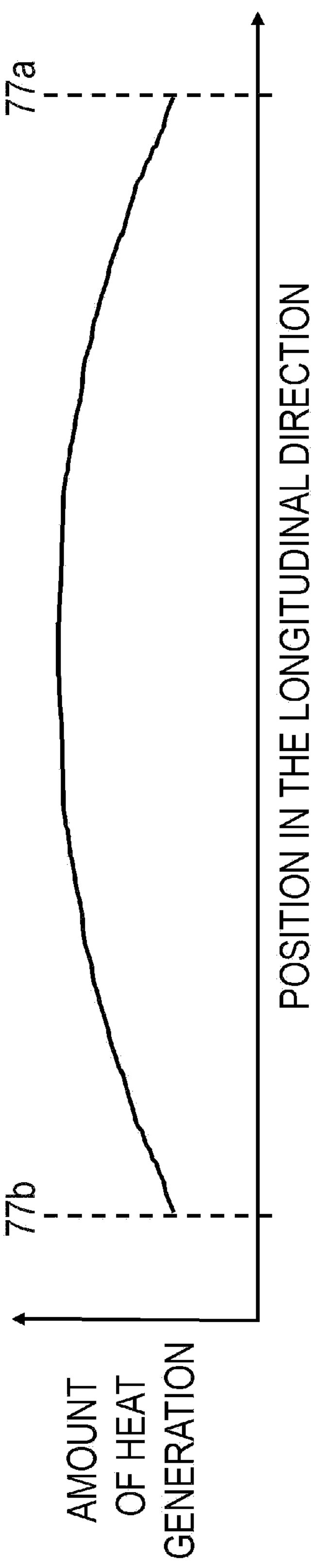

FIGS. 11A to 11C are explanatory diagrams of the ceramic heater 70 according to Example 3. FIG. 11A illustrates configurations of the heat generating element 77 and the heat generating elements 78 in the ceramic heater 70 according to Example 3. FIG. 11B is a graph illustrating a temperature distribution in the ceramic heater 70 in the longitudinal direction when only the heat generating element 77 generates heat. FIG. 11C is a graph illustrating a temperature distribution in the ceramic heater 70 in the longitudinal direction when only the heat generating elements 78 generate heat.

As illustrated in FIG. 11A, in the ceramic heater 70, as resistive heat generating elements capable of securing the amounts of heat generation at end portions while reducing thermal stress, one heat generating element 77 and two heat generating elements 78 that extend from the first end portion 70*a* to the second end portion 70*b* in the longitudinal direction are provided. The resistive heat generating elements are disposed side by side in the lateral direction in the order of the heat generating element 78 (second heat generating element), the heat generating element 77 (first heat generating element), and the heat generating element 78 (third heat generating element). In Example 3, the two heat generating elements 78 are electrically connected, and currents with the same magnitude are caused to flow therethrough such that the amounts of heat generation are controlled to be equal to each other. On the other hand, the heat generating element 77 and the heat generating elements 78 are controlled independently from each other. The heat generating means in the ceramic heater 70 is configured by the heat generating elements of two systems.

In FIGS. 11A and 11B, the positions of one end 77*a* of the heat generating element 77 on the first end portion 70*a* side of the ceramic heater 70 in the longitudinal direction and the other end 77*b* on the second end portion 70*b* side are indicated by dotted lines. One end of the heat generating element 78 on the first end portion 70*a* side is at the same position as the one end 77*a*, and one end on the second end portion 70*b* side is at the same position as the other end 77*b*. A longitudinal distance from the one end 77*a* to the other end 77*b* is equal to the longitudinal distance from the one end 72*a* to the one end 73*a* in Example 1.

The heat generating element 77 is formed into a tapered shape in which the width in the lateral direction gradually changes such that the width becomes maximum at a center portion in the longitudinal direction and becomes minimum at end portions. Thus, a resistance value of the heat generating element 77 is the lowest at the center portion in the longitudinal direction, and becomes gradually higher as being closer to the end portions. As described above, the amount of heat generation of a resistive heat generating element is equivalent to power determined by a product of the square of a value of current flowing through the resistive heat generating element and a resistance value thereof. Thus, the amount of heat generation of the heat generating element 77 becomes gradually larger as being closer to the end portions from the center portion in the longitudinal direction.

On the other hand, the heat generating element 78 is formed into a tapered shape in which the width in the lateral direction gradually changes such that the width becomes maximum at the center portion in the longitudinal direction and becomes minimum at the end portions. Thus, a resistance value of the heat generating element 78 is the highest at the center portion in the longitudinal direction, and becomes gradually lower as being closer to the end portions. Thus, the amount of heat generation of the heat generating element 78 becomes gradually smaller as being closer to the end portions from the center portion in the longitudinal direction.

The heat generating elements 77 and 78 are each formed to extend from the first end portion 70*a* to the second end portion 70*b* of the ceramic heater 70 in the longitudinal direction, and formed continuously in the longitudinal direction. Furthermore, the heat generating element 77 and the heat generating elements 78 are disposed with gaps in the lateral direction. Such a configuration can prevent the occurrence of thermal stress caused by a difference in amount of heat generation of adjacent heat generating elements, and suppress the breakage of an insulating glass layer.

Furthermore, the amounts of heat generation of the heat generating elements 77 and 78 have a complementary relation as illustrated in FIGS. 11B and 11C. The ceramic heater 70 in Example 3 is configured by combining the heat generating element 77 whose amounts of heat generation at the longitudinal direction end portions are large and the heat generating element 78 whose amount of heat generation at the longitudinal direction center portion is large. By controlling energization to the resistive heat generating elements, the amount of heat generation as the heating unit 61 is controlled.

In Example 3, in the case of corner adhesion, by energizing only the heat generating element 77, the amount of heat necessary for a thermocompression step can be secured at a position corresponding to a corner portion of a sheet P where an adhesion toner image Ti is formed. Furthermore, substantially the entire region of an edge portion of a sheet P is pressed while being sandwiched by the first pressure plate 62 and the second pressure plate 67. Thus, the configuration in Example 3 can reduce the amount of power consumption as compared to a configuration in which the amount of heat generation is controlled to be uniform in the longitudinal direction, while suppressing the displacement of the sheet P.

Furthermore, in Example 3, in the case of line adhesion, by energizing both the heat generating element 77 and the heat generating elements 78, the entire thermocompression unit 60 in the longitudinal direction is controlled to generate heat such that the amount of heat necessary for a thermocompression step can be secured at a position corresponding to an edge portion of a sheet P where an adhesion toner image Ti is formed. Then, by controlling the amount of heat generation of the heat generating element 77 to be high, the amounts of heat generation at both end portions of the ceramic heater 70 in the longitudinal direction can be increased to suppress the escape of heat. In addition, according to Example 3, stable adhesiveness can be obtained to suppress the decrease in quality of a booklet.

In Example 3, the control unit 90 controls the energization to the heat generating elements 77 and 78 such that detection temperatures of the plurality of thermistors 64 become a thermocompression control temperature, and hence the amount of heat generation of the heating unit 61 is controlled in accordance with adhesion forms and adhesion conditions. Also in Example 3, similarly to Example 2, the control temperatures of the heat generating elements 77 and 78 can be adjusted as appropriate in accordance with the warming state of the thermocompression unit 60 and the environment temperature.

As described above, with the configuration in Example 3, the plurality of heat generating elements each having a tapered shape in which the width gradually changes in the longitudinal direction can be controlled independently from each other, and hence the end portions and the center portion of the first pressure plate 62 in the longitudinal direction can be heated to different temperatures. Thus, the amounts of heat generation can be controlled so as to compensate for the escape of heat from both end portions of the thermocompression unit 60 in the longitudinal direction while suppressing the occurrence of thermal stress, and hence the thermocompression operation can be stably executed and the decrease in quality of a booklet can be suppressed.

Furthermore, the amounts of heat generation of the heat generating elements in Example 3 have a complementary relation, and hence longitudinal temperature profiles of the heat generating elements 77 and 78 can be freely changed through control of changing the ratio of energization to the heat generating elements in accordance with the detection temperatures of the plurality of thermistors 64. In other words, the configuration in Example 3 enables complicated heat generation control with a higher degree of freedom as compared to the configuration in Example 2.

Second Modification

In Examples 2 and 3, the resistive heat generating element is formed to have a shape symmetric in the longitudinal direction. However, the resistive heat generating element is not necessarily required to be formed into a shape symmetric in the longitudinal direction. For example, when an adhesion position for corner adhesion (position at which adhesion toner image Ti is disposed) is fixed, the resistive heat generating element may be configured such that the amount of heat generation at a longitudinal direction end portion corresponding to the adhesion position is larger than the amount of heat generation at an end portion on the opposite side. Next, a second modification of Example 3 that employs a resistive heat generating element formed into a shape asymmetric in the longitudinal direction is described.

Figure 12A:
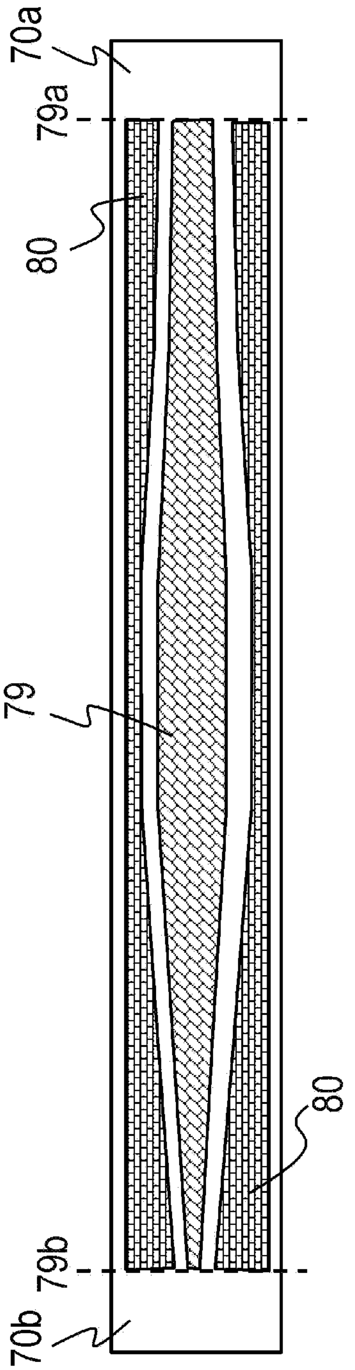
FIGS. 12A and 12B are explanatory diagrams of a ceramic heater according to a second modification of Example 3.
Figure 12B:
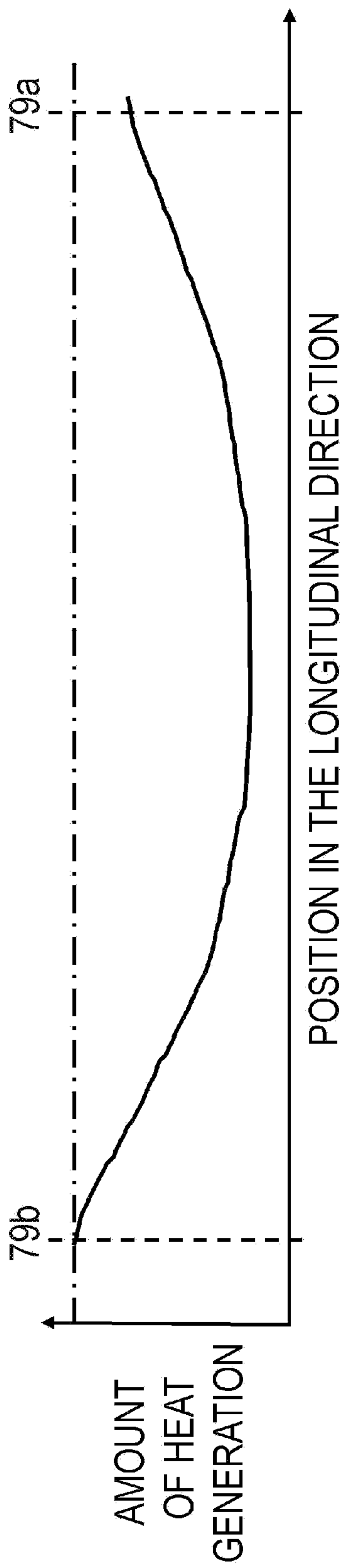

FIGS. 12A and 12B are explanatory diagrams of a ceramic heater 70 according to the second modification. FIG. 12A illustrates configurations of a heat generating element 79 as a first heat generating element and a heat generating element 80 as a second heat generating element in the ceramic heater 70 according to the second modification. FIG. 12B is a graph illustrating a temperature distribution in the ceramic heater 70 in the longitudinal direction when the heat generating element 79 generates heat. In FIGS. 12A and 12B, the positions of one end 79*a* of the heat generating element 79 in the longitudinal direction of the ceramic heater 70 on the first end portion 70*a* side and the other end 79*b* on the second end portion 70*b* side are indicated by dotted lines.

In the second modification, similarly to Example 3, one heat generating element 79 and two heat generating elements 80 that extend from the first end portion 70*a* to the second end portion 70*b* in the longitudinal direction are provided. The second modification is different from Example 3 in that the width in the lateral direction of the end portion of the heat generating element 79 on the second end portion 70*b* side is smaller than the width in the lateral direction of the end portion on the first end portion 70*a* side.

The second modification is configured on the assumption that sheets P are aligned such that a corner portion at which an adhesion toner image Ti is formed is located near the second end portion 70*b* of the ceramic heater 70 during thermocompression operation for corner adhesion. By configuring the heat generating element 79 as described above, as illustrated in FIG. 12B, the amount of heat generation at the end portion on the second end portion 70*b* side by the heat generating element 79 is larger than the amount of heat generation at the end portion on the first end portion 70*a* side. In other words, according to the second modification, the amount of heat necessary for the thermocompression operation can be secured at the second end portion 70*b*, and the amount of heat capable of suppressing the escape of heat can be secured at the first end portion 70*a*. In addition, stable adhesiveness can be obtained to suppress the decrease in quality of a booklet.

Furthermore, the heat generating element whose amounts of heat generation in the longitudinal direction are asymmetric as in the second modification is suitable for a configuration in which thermal flows in the ceramic heater 70 are asymmetric in the longitudinal direction due to the configuration of the thermocompression unit 60. The thermal flows in the ceramic heater 70 may be asymmetric in the longitudinal direction depending on a support configuration in the ceramic heater 70 and the presence/absence of an electric contact for energization to the resistive heat generating element. Thus, the configuration in the second modification is suitable for the case where thermal flows need to be uniform in the longitudinal direction depending on configurations of peripheral members of the ceramic heater 70 by changing the amount of heat generation in the longitudinal direction.

Other Modifications

Note that, in the above-mentioned examples, temperature control of the thermocompression unit 60 is performed on the basis of a detection temperature of the thermistor 64 contacting the ceramic heater 70, but the present invention is not limited to such a configuration. For example, the temperature of the first pressure plate 62 may be detected by another temperature detection means, and temperature control of the thermocompression unit 60 may be performed on the basis of a detection temperature thereof.

Furthermore, the thermocompression unit 60 is configured by the first pressure plate 62 made of metal and the second pressure plate 67 made of silicon rubber, but the present invention is not limited to such a configuration. For example, a unit including a pressure plate made of silicon rubber may be pressed toward a sheet P by the pressure lever 65, and the position of a pressure plate made of metal to be heated may be fixed.

Furthermore, in the first modification and Example 3, the width of the resistive heat generating element in the lateral direction is changed to change the resistance value of the resistive heat generating element in the longitudinal direction such that the amount of heat generation of the thermocompression unit 60 is changed in the longitudinal direction, but the present invention is not limited to such a configuration. For example, by changing the resistance value of the resistive heat generating element in the longitudinal direction by another method, such as a method of changing the thickness of the resistive heat generating element in the longitudinal direction, the amount of heat generation of the thermocompression unit 60 may be changed in the longitudinal direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-119406, filed on Jul. 21, 2023, which is hereby incorporated by reference herein in its entirety.

What is claimed is:

1. A sheet thermocompression apparatus for bonding a plurality of sheets to one another, the sheet thermocompression apparatus comprising:

a loading portion in which sheets having adhesion toner formed thereon are loaded in a loading direction; and a thermocompression unit comprising:

a pressing member elongated in a longitudinal direction, for pressing the sheets loaded in the loading portion in the loading direction, the pressing member overlapping a region of a sheet loaded in the loading portion from one end portion to another end portion in the longitudinal direction in a case where the pressing member is viewed from the loading direction; and a heating source for heating the pressing member, the heating source being capable of heating an end portion and a center portion of the pressing member in the longitudinal direction to different temperatures, wherein the heating source comprises a substrate elongated in the longitudinal direction and a first heat generating element and a second heat generating element that are disposed on a surface of the substrate, wherein the sheet thermocompression apparatus further comprises a control unit capable of independently controlling an amount of heat generation of the first heat generating element and an amount of heat generation of the second heat generating element, and wherein, in a case where the first heat generating element and the second heat generating element are viewed from the loading direction, the first heat generating element is disposed at a position overlapping an end portion of the substrate in the longitudinal direction, and the second heat generating element is disposed at a position overlapping a center portion of the substrate in the longitudinal direction.

2. The sheet thermocompression apparatus according to claim 1, wherein the thermocompression unit comprises, in a case where the thermocompression unit is viewed from the loading direction: a first temperature measurement sensor disposed at a position overlapping the first heat generating element; and a second temperature measurement sensor disposed at a position overlapping the second heat generating element, and wherein the control unit controls the amount of heat generation of the first heat generating element on the basis of a detection temperature of the first temperature measurement sensor and the amount of heat generation of the second heat generating element on the basis of a detection temperature of the second temperature measurement sensor.

3. The sheet thermocompression apparatus according to claim 2, wherein the control unit is capable of executing a first mode in which only the first heat generating element generates heat and a second mode in which the first heat generating element and the second heat generating element generate heat.

4. The sheet thermocompression apparatus according to claim 2, wherein the control unit controls the amount of heat generation of the first heat generating element on the basis of a number of repetitions of a thermocompression step performed by the thermocompression unit in addition to the detection temperature of the first temperature measurement sensor.

5. The sheet thermocompression apparatus according to claim 2, wherein the control unit controls the amount of heat generation of the first heat generating element on the basis of an environment temperature in an environment in which the thermocompression unit is placed in addition to the detection temperature of the first temperature measurement sensor.

6. The sheet thermocompression apparatus according to claim 1, wherein the heating source comprises a third heat generating element disposed on the surface of the substrate, and wherein, in a case where the third heat generating element is viewed from the loading direction, the third heat generating element is disposed at a position overlapping an end portion of the substrate in the longitudinal direction on a side opposite to the first heat generating element.

7. The sheet thermocompression apparatus according to claim 6, wherein the third heat generating element is electrically connected to the first heat generating element, and a current having the same magnitude as in the first heat generating element is caused to flow through the third heat generating element.

8. The sheet thermocompression apparatus according to claim 7, wherein the control unit is capable of executing, in a switching manner, a first mode in which the first heat generating element and the third heat generating element generate heat and a second mode in which the first heat generating element, the second heat generating element, and the third heat generating element generate heat.

9. The sheet thermocompression apparatus according to claim 1, wherein the substrate is made of ceramic.

10. The sheet thermocompression apparatus according to claim 1, comprising an alignment mechanism for aligning sheets, which are loaded in the loading portion, on one side thereof along the longitudinal direction of the pressing member.

11. The sheet thermocompression apparatus according to claim 1, wherein, in a case where the pressing member is regarded as a first pressure plate elongated in the longitudinal direction, the sheet thermocompression apparatus comprises:

a second pressure plate that constitutes a part of a loading surface of the loading portion, the second pressure plate being disposed at a position overlapping the first pressure plate in a case where the second pressure plate is viewed from the loading direction, the second pressure plate being configured to sandwich a sheet loaded in the loading portion together with the first pressure plate; and a movement mechanism for moving the first pressure plate toward the second pressure plate integrally with the heating source.

12. The sheet thermocompression apparatus according to claim 11, wherein the first pressure plate has an elastic modulus of 1,000 Pa or more, and wherein the second pressure plate has an elastic modulus of 1,000 Pa or less.

13. A sheet thermocompression apparatus comprising:

a loading portion in which sheets having adhesion toner formed thereon are loaded in a loading direction; and a thermocompression unit comprising:

a pressing member elongated in a longitudinal direction, for pressing the sheets loaded in the loading portion in the loading direction, the pressing member overlapping a region of a sheet loaded in the loading portion from one end portion to another end portion in the longitudinal direction in a case where the pressing member is viewed from the loading direction; and a heating source for heating the pressing member, the heating source being capable of heating an end portion and a center portion of the pressing member in the longitudinal direction to different temperatures, wherein the heating source comprises a substrate elongated in the longitudinal direction; and a first heat generating element provided on a surface of the substrate, wherein the first heat generating element extends from a first end portion to a second end portion of the substrate in the longitudinal direction, and wherein a resistance value of an end portion of the first heat generating element in the longitudinal direction is larger than a resistance value of a center portion of the first heat generating element in the longitudinal direction.

14. The sheet thermocompression apparatus according to claim 13, wherein a width in a lateral direction orthogonal to the longitudinal direction of the end portion of the first heat generating element in the longitudinal direction is smaller than a width in the lateral direction of the center portion of the first heat generating element in the longitudinal direction.

15. The sheet thermocompression apparatus according to claim 13, wherein the heating source comprises a second heat generating element provided on the surface of the substrate so as to be adjacent to the first heat generating element in a lateral direction orthogonal to the longitudinal direction, wherein the second heat generating element extends from the first end portion to the second end portion of the substrate, and wherein a resistance value of an end portion of the second heat generating element in the longitudinal direction is smaller than a resistance value of a center portion of the second heat generating element in the longitudinal direction.

16. The sheet thermocompression apparatus according to claim 15, wherein a width of the first heat generating element in the lateral direction gradually decreases from the center portion of the first heat generating element in the longitudinal direction toward the end portion of the first heat generating element, and wherein a width of the second heat generating element in the lateral direction gradually increases from the center portion of the second heat generating element in the longitudinal direction toward the end portion of the second heat generating element.

17. The sheet thermocompression apparatus according to claim 15, wherein the sheet thermocompression apparatus comprises a control unit capable of independently controlling an amount of heat generation of the first heat generating element and an amount of heat generation of the second heat generating element.

18. The sheet thermocompression apparatus according to claim 17, wherein the control unit is capable of executing, in a switching manner, a first mode in which the first heat generating element and the second heat generating element generate heat such that a temperature of the end portion of the pressing member in the longitudinal direction becomes higher than a temperature of the center portion of the pressing member in the longitudinal direction and a second mode for controlling the first heat generating element and the second heat generating element such that temperatures of the pressing member are uniform in the longitudinal direction.

19. The sheet thermocompression apparatus according to claim 13, wherein the first heat generating element has a shape symmetric in the longitudinal direction.

20. The sheet thermocompression apparatus according to claim 13, wherein the first heat generating element has a shape asymmetric in the longitudinal direction.

21. The sheet thermocompression apparatus according to claim 13, wherein the substrate is made of ceramic.

22. A post-processing apparatus to be connected to an image forming apparatus for forming an image on a sheet, the post-processing apparatus comprising a sheet thermocompression apparatus for bonding a plurality of sheets to one another, the sheet thermocompression apparatus comprising:

a loading portion in which sheets having adhesion toner formed thereon are loaded in a loading direction;

a thermocompression unit comprising:

a pressing member elongated in a longitudinal direction, for pressing the sheets loaded in the loading portion in the loading direction, the pressing member overlapping a region of a sheet loaded in the loading portion from one end portion to another end portion in the longitudinal direction in a case where the pressing member is viewed from the loading direction; and a heating source for heating the pressing member, the heating source being capable of heating an end portion and a center portion of the pressing member in the longitudinal direction to different temperatures, wherein the heating source comprises a substrate elongated in the longitudinal direction and a first heat generating element and a second heat generating element that are disposed on a surface of the substrate, wherein the sheet thermocompression apparatus further comprises a control unit capable of independently controlling an amount of heat generation of the first heat generating element and an amount of heat generation of the second heat generating element, and wherein, in a case where the first heat generating element and the second heat generating element are viewed from the loading direction, the first heat generating element is disposed at a position overlapping an end portion of the substrate in the longitudinal direction, and the second heat generating element is disposed at a position overlapping a center portion of the substrate in the longitudinal direction; and a conveyance mechanism for conveying a sheet on which an image has been formed by the image forming apparatus to the sheet thermocompression apparatus.

* * * * *